United States Patent
Edwards et al.

(10) Patent No.: US 11,763,033 B2
(45) Date of Patent: *Sep. 19, 2023

(54) LEVERAGING ENTITY DARK WEB CHATTER USING SLOPE OF VENDOR IDENTIFIER APPEARANCES AS A SEARCH PROXY

(71) Applicant: Bank of America Corporation, Charlotte, NC (US)

(72) Inventors: Alexander T. Edwards, Blacksburg, VA (US); Peggy J. Qualls, Oswego, IL (US)

(73) Assignee: Bank of America Corporation, Charlotte, NC (US)

( * ) Notice: Subject to any disclaimer, the term of this patent is extended or adjusted under 35 U.S.C. 154(b) by 406 days.

This patent is subject to a terminal disclaimer.

(21) Appl. No.: 17/140,004

(22) Filed: Jan. 1, 2021

(65) Prior Publication Data

US 2022/0215130 A1    Jul. 7, 2022

(51) Int. Cl.
*G06F 21/62* (2013.01)
*G06F 40/35* (2020.01)
(Continued)

(52) U.S. Cl.
CPC ........ *G06F 21/6263* (2013.01); *G06F 16/951* (2019.01); *G06F 16/9537* (2019.01); *G06F 21/6272* (2013.01); *G06F 40/35* (2020.01)

(58) Field of Classification Search
CPC ............... G06F 21/6263; G06F 16/951; G06F 16/9537; G06F 21/6272; G06F 40/35; G06F 16/3331; G06F 16/3334; G06F 40/20
(Continued)

(56) References Cited

U.S. PATENT DOCUMENTS 10,542,046 B2   1/2020   Katragadda et al.
11,030,562 B1   6/2021   Dean et al.
(Continued)

FOREIGN PATENT DOCUMENTS

KR      102060766      5/2019
WO   WO2017/115272   7/2017

OTHER PUBLICATIONS

"Slope of Linear Functions," http://www.columbia.edu/itc/sipa/math/slope_linear.html#:~text=Calculating%20the%20slope%20of%20a%20linear%20function&text=Slope%20shows%20the%20change%20in.any%20two%20values%20of%20x., Retrieved on Oct. 14, 2021.
(Continued)

*Primary Examiner* — Bryan F Wright
(74) *Attorney, Agent, or Firm* — Weiss & Arons LLP

(57) ABSTRACT

A method for reducing a level of secure data exposure within the dark web may be provided. The secure data may be associated with a third party data custodian that may be associated with a pre-determined entity. The method may include searching the communications to identify one or more single locations that may include numerous communications that may include text identifying the selected third party data custodian. Each communication may be assigned a time-stamp in order to calculate a speed of how many communications within a pre-determined time period may be identified to include text identifying the third party data custodian. Simultaneous to the searching, the method may include running a time clock. When a rate per unit of time of identification of each identifying text is equal to or greater than a pre-determined rate per unit of time, increasing a monitoring at the one or more single locations.

20 Claims, 14 Drawing Sheets

(51) Int. Cl.
*G06F 16/9537* (2019.01)
*G06F 16/951* (2019.01)

(58) Field of Classification Search
USPC .......................................................... 726/26
See application file for complete search history.

(56) References Cited

U.S. PATENT DOCUMENTS

| | | | |
|---|---|---|---|
| 11,194,925 | B1 | 12/2021 | Roturier et al. |
| 11,403,349 | B2* | 8/2022 | Mannar .................. H04L 67/02 |
| 2009/0204610 | A1 | 8/2009 | Hellstrom et al. |
| 2018/0032533 | A1 | 2/2018 | Singh et al. |
| 2018/0288073 | A1 | 10/2018 | Hopper |
| 2019/0007440 | A1 | 1/2019 | Lavi et al. |
| 2019/0012456 | A1* | 1/2019 | Moore .................. G06N 20/00 |
| 2019/0266355 | A1 | 8/2019 | Lockhart, III et al. |
| 2019/0347440 | A1 | 11/2019 | Langley |
| 2019/0349393 | A1 | 11/2019 | Nunes et al. |
| 2020/0004989 | A1* | 1/2020 | Lockhart, III ...... G06F 21/6263 |
| 2020/0106793 | A1 | 4/2020 | Vanamali |
| 2020/0137109 | A1* | 4/2020 | Endler .................. H04L 63/083 |
| 2020/0151222 | A1 | 5/2020 | Mannar et al. |
| 2020/0193284 | A1 | 6/2020 | Nguyen et al. |
| 2020/0210590 | A1 | 7/2020 | Doyle et al. |
| 2021/0019235 | A1* | 1/2021 | Savir ...................... G06F 40/30 |
| 2021/0226968 | A1 | 7/2021 | Kvochko et al. |
| 2021/0392130 | A1* | 12/2021 | Verma .................... H04L 63/30 |
| 2022/0067755 | A1 | 3/2022 | Channer et al. |

OTHER PUBLICATIONS

"Dark Web," https://en.wikipedia.org/wiki/Dark_web, Wikimedia Foundation, Inc., Dec. 10, 2019.

"Darknet," https://en.wikipedia.org/wiki/Darknet, Wikimedia Foundation, Inc., Oct. 13, 2020.

* cited by examiner

LEVERAGING ENTITY DARK WEB CHATTER USING SLOPE OF VENDOR IDENTIFIER APPEARANCES AS A SEARCH PROXY

CROSS-REFERENCE TO RELATED APPLICATION

Co-pending, Commonly-Assigned application Ser. No. 17/140,003 entitled "LEVERAGING ENTITY DARK WEB CHATTER USING VENDOR POPULATION AS A SEARCH PROXY", filed on even date herewith, is hereby incorporated by reference herein in its entirety.

FIELD OF TECHNOLOGY

Aspects of the disclosure relate to protection entity-private data resident at third party custodians.

BACKGROUND OF THE DISCLOSURE

Entities, both small and large, handle and manage large amounts of data. Some of the data may be public data. Some of the data may be private data. The data may be entity-internal data. The data may be data associated with employees of the entity. Additionally, many entities handle and manage personal and private data of their clients.

A large amount of entity data may be located at, and maintained by, third party custodians associated with the entities. Some third party custodians may have access to entity data located within the entity.

Such third party custodians may each have their own procedures for securing the data, independent of the associated entity.

Entities typically make every attempt to protect their data that is either being accessed or maintained by third party custodians. Entities may use different systems and applications to monitor their data that is being accessed and/or maintained by each third party custodian.

To the extent that the third parties are accessible from the web, such data may be in jeopardy from a web-mounted attack.

Specifically, the dark web is a portion on the internet where very often cyber hackers work together to hack into and retrieve private data residing within different entities. It is difficult to track users of the dark web since identities and locations of darknet users stay anonymous and cannot be tracked due to the layered encryption system. Encryption technology within the darknet routes users data through a large number of intermediate servers, which protects the users identity and guarantees anonymity.

Therefore, it would be desirable for entities to be enabled to at least monitor activity on the dark web and review the chatter between the users of the dark web in order to prevent private data exposure.

It would be further desirable for entities to be enabled to forecast an increase in a level of chatter on the dark web associated with third parties in order to execute additional measures for securing entity private data exposure.

SUMMARY OF THE DISCLOSURE

A method for identifying a level of private data exposure is provided. The private data exposure may be associated with a third party data custodian. The third party data custodian may be selected from a plurality of third party data custodians associated with a pre-determined entity, or at some other suitable location. The method may be performed on dark web users electronic communications within a dark web portion of the internet. The method may enable protection of private data of the pre-determined entity.

The method may include searching, periodically, the dark web users communications. The searching may be performed via a text-search analysis engine located on a centralized server of the pre-determined entity. The searching may enable retrieving one or more dark web user communications. Such retrieval may include using a text search to identify the selected third party data custodian that relate to the entity.

The method may also include indexing results of the search to identify and determine additional indications of a level of private data exposure.

Private data may be personal data associated with the entity. Private data may be personal data associated with employees of the entity and/or customers of the entity. Private data may include personal identification information. Private data may include personal account/finance information.

The searching may also enable indexing the communications that may include text identifying the selected third-party custodian.

The method may further include identifying one or more communications that may include the identifying text. For each communication that includes the identifying text, the method may include increasing, by one digit, a total name count occurrence counter for the selected third party data custodian.

In one example, the method may return from the dark web large amounts of hits identifying communications that may include text identifying a name of the third party data custodian.

In some embodiments, when the total count of identifying text escalates to a pre-determined magnitude, the method may include locking, from external access, the private data residing within a network of the selected third party data custodian.

In some embodiments, when the total count of identifying text escalates to the pre-determined magnitude, the method may include withdrawing the private data from the third-party's network.

Following the identifying of the one or more communications comprising the identifying text, the method may also include retrieving the one or more communications comprising the identifying text. The method may further include analyzing, using sentiment analysis, the one or more communications. The analyzing may be performed to identify keywords that may link to the level of the private data exposure.

When one or more keywords are identified within the one of more communications comprising identifying text, the method may further include increasing a monitoring of the private data. The increasing may include modifying the searching from a periodic searching to continuously searching the dark web users communications for additional communications comprising identifying text.

It should be appreciated that when a cluster of communications within a single location are identified to include identifying text, the method may further include increasing a monitoring for additional communications at the single location. A single location may be for example, a single server. The instructions for hacking may be generated by a single server or by more than one server.

The increasing may include searching, the single location continuously. The increasing may also include analyzing further, the cluster of communications identified within the single location, for negative sentiment data.

The method may include, in some embodiments, when selecting, selecting a first subset of third party data custodians from the plurality of third party data custodians. The selecting may identify the level of private data exposure. The selecting may include extracting from the plurality of third party data custodians, third party data custodians that may have access to private data associated with the entity. The selecting may include extracting from the plurality of third party data custodians, third party data custodians that may maintain within a database, private data associated with the entity.

In some embodiments, when selecting, the method may include selecting a second subset of third party data custodians. The second subset may be a subset selected from the selected first subset of third party data custodians. The selecting may include extracting from the first subset, third party data custodians that may have access to entity-related private data. The selecting may include extracting from the first subset, third party data custodians that may maintain the entity-related private data.

For the second subset, the searching may include searching, periodically, dark web users communications for communications that may include identifying text associated with the second subset of third party data custodians. The periodic searching for the second subset may be more frequent than the periodic searching for the first subset.

In some embodiments, when selecting, the method may include, selecting a third subset of third party data custodians. The third subset may be a subset selected from the selected first subset of third party data custodians. The selecting may include extracting from the first subset of third party data custodians, third party data custodians that may have access to entity's customer-related private data. The selecting may include extracting from the first subset of third party data custodians, third party data custodians that may maintain the entity's customer-related private data.

For the third subset, the searching may include performing a continuous search. In some embodiments, the searching may include periodically searching at a rate greater than the searching currently practiced for the second subset. In some embodiments, the method may include continuously searching the dark web users communications for communications that may include identifying text associated with the third subset of third party data custodians.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
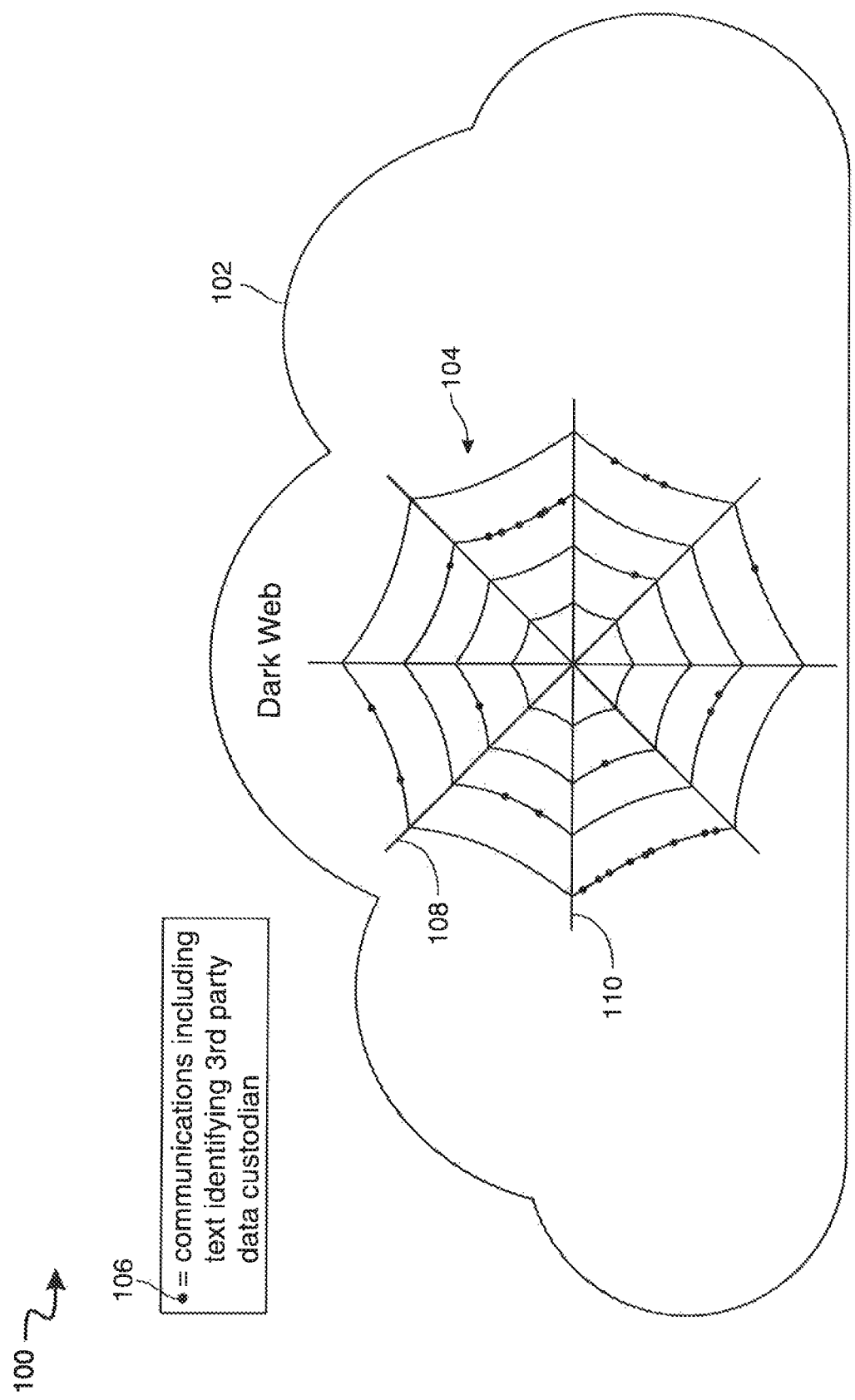
FIG. 1 shows an illustrative diagram in accordance with principles of the disclosure.

A dark web monitoring system is provided. The dark web monitoring system may be for monitoring dark web users communications within a dark web portion of the internet. The monitoring may be for identifying a level of private data exposure associated with a selected third party data custodian. The third party data custodian may be selected from a plurality of third party data custodians associated with a pre-determined entity.

The pre-determined entity may be a small or large company, corporation and/or business. A smaller entity, with less employees, may do business and/or be associated with a minimal amount of third party custodians. A larger entity may do business and/or be associated with a greater number of third party custodians.

Third party custodians associated with the pre-determined entity may be vendors and/or service providers such as an online portal web hosting service.

Each third party custodian may maintain and store data relating to the pre-determined entity. In some embodiments, each third party custodian may only have access to the data stored at the entity and may not physically store the data.

Some of the third party custodians may be involved with only public data. Some of the third party custodians may be involved with private data. In some embodiments, third party custodians may be involved with both public and private data. The public data may be non-confidential information associated with the pre-determined entity. The private data may be confidential and private. The data may include personal and/or private information of employees of the entity. The data may include personal and/or private information of the customers of the entity.

The dark web is a part of the deep web not indexed by search engines. The dark web may include publicly visible websites that hide internet protocol ("IP") addresses of servers that run the websites. Individuals and/or groups of people may communicate, electronically and 'invisibly' to plan ways and methods for security attacks, cyber-attacks and many other undesirable activities.

Identities and locations of darknet users stay anonymous and may not be tracked due to the layered encryption system. The darknet encryption technology routes users data through a large number of intermediate servers, which protects the users identity and guarantees anonymity. Transmitted information within the dark web may be decrypted only by a subsequent node in the scheme, which leads to the exit node. This system makes it almost impossible to reproduce the node path and decrypt the information layer by layer. Websites may not be able to track geolocation and IP of their users, and users may not be able to get this information about the host. This may be due to the high level of encryption. This architecture may enable communication between darknet users to be highly encrypted allowing users to talk, blog, and share files confidentially. At least monitoring activity on the dark web may enable protection of entity data.

The system may include a central server associated with the pre-determined entity. The central server may include a text-analysis search engine. The text-analysis search engine may be configured to search, periodically, the dark web. By searching the dark web, potential security breaches, hacking and attacks on pre-determined entity data may be enabled to be identified and prevented.

The searching may be for retrieving communications comprising text identifying the selected third-party data custodian. The searching may also be for indexing communications comprising text identifying the selected third-party data custodian.

Communications within the dark web may include, but may not be limited to, communications within a website, blog, tweet, email and text.

It should be appreciated that the searching may be performed within the dark web and on all publicly available areas of the internet. This may include but may not be limited to, searching social media blogs, Facebook®, Twitter® and other locations on the world wide web.

Text that may be used by the text-analysis engine to identify the selected third party data custodian may be retrieved from a list of keywords stored in a library within the central server that may describe the third party data custodian. Text that may identify the third party data custodian may be an official name of the third party data custodian. Identifying text may also include a name and/or partial name the third party data custodian does business as. The list of keywords may include the full name, partial name, title the third party data custodian does business as and/or keywords that describe the custodian.

Identifying text may further include matching and/or partially matching words in each communication to the keyword list associated with the selected third party data custodian.

Following the search, the text-analysis engine may identify one or more communications comprising identifying text.

The central server may also include at least one processor. The at least one processor may be coupled to a memory. The processor may be configured to retrieve, in real-time, from the text-analysis search engine the one or more communications comprising identifying text.

For each communication comprising the identifying text, the processor may increase, by one digit, a total name count occurrence counter for the selected third party data custodian.

The processor may then be configured to store, in a database within the central server, the one or more communications comprising identifying text. By storing the one or more communications, a sentiment analysis may be enabled to be performed on the one or more communications.

The processor may analyze, using sentiment analysis, the one or more communications comprising identifying text, to identify negative sentiment data associated with the selected third party data custodian.

Text within communications that may indicate negative sentiment may include commonly used negative and pessimistic type of words. Additionally, and more specifically within the dark web, text indicating negative sentiment may include words associated and linked with cyber attacks and other forms of data leaking and security breaching.

For each communication comprising negative sentiment data, the processor may be configured to increase a total negative sentiment communication occurrence counter by one digit.

The processor may track the total counter for both the name count occurrence counter and the negative sentiment communication occurrence counter. When a percentage of the total name count occurrence counter divided by the total negative sentiment communication occurrence counter is equal to or greater than a pre-determined percentage, the system may be configured to increase a monitoring of the third party data custodian.

In some embodiments, when at least one negative sentiment may be identified within the communication, the system may automatically be configured to take immediate action and withdraw entity data from the selected third party data custodian.

The monitoring may be increased by adjusting the searching on the dark web from a periodic searching to a continuous search. The monitoring may be increased by adjusting the search from a first rate periodic search to an accelerated periodic search.

Periodic searching may involve searching the dark web once a day. Periodic searching may involve searching the dark web multiple times a day. When monitoring is increased, the accelerated periodic search may include searching the dark web at least double the amount of times that the first rate periodic search may be performed.

In some embodiments, when the monitoring involves increasing the searching from a periodic search to a continuous search, the security of the data may be greatly enhanced.

In some embodiments, when the percentage is equal to or greater than the pre-determined percentage, the system may be configured to withdraw the data from the third-party's data network.

In some embodiments, when the percentage is equal to or greater than the pre-determined percentage, the system may be configured to lock the private data within the third party network from external access.

Additionally, the system may transmit an alert to the third party data custodian and/or the entity of the potential private data breach. The alert may be an electronic communication.

In one example, selected third party data custodian(s) may only be able to access the private entity data via a secure token received from the entity. The entity may carry a protective data key and the third party data custodians may be required to retrieve a token key from the entity when accessing the private data. When a potential threat may be identified, the entity may be enabled to lock the protective data key and may not return, at least temporarily, a token key to the third party data custodian thereby terminating access to the private data.

In another example, the system of the entity may include a trapped door data transmitter, which when executed by the processor, may be enabled to eject and permanently delete private data from the selected third party data custodian(s).

When the processor retrieves each communication comprising the identifying text, the method may also include, retrieving a communication location associated with each communication. The communication location may be a URL of a website that the communication(s) may be retrieved from. The communication location may be a URL that includes the specific page on the website where the communication may be retrieved from.

The processor may then be configured to determine whether there are numerous communications comprising identifying text coming from the same location within the dark web. This may be a signal of potential threat to the system.

The processor may identify a cluster of communications extracted from the same communication location. The processor may then instruct the text-analysis engine to increase a monitoring of the communication location. The processor may further analyze a sentiment of the cluster of communications to determine whether there is negative sentiment data within each communication.

When negative sentiment data is identified within the cluster of communications, the system may be configured to automatically withdraw the private data of the pre-determined entity that may be located at the third party data custodian.

In some embodiments, the text-analysis search engine may be configured to search for or more communications that may include both, the identifying text associated with the selected third party data custodian and text identifying the pre-determined entity. The searching for the combination may enable precisely targeting potential threats to private data associated with the pre-determined entity that may be accessed/maintained by the selected third party data custodian.

It should be appreciated that the central server may include a third party data custodian library. The selected third party data custodian may be selected from the third party data custodian library. In some embodiments, the system may be configured to select a plurality of third party data custodians for monitoring on the dark web.

Some third party data custodians associated with entities may handle and manage an entity's public data. Entities may not feel the need to oversee and monitor these third party data custodians for a security breach since the data they maintain may not be personal and/or private. Other third party data custodians may manage private and/or personal data which may require monitoring.

The system may be configured to group pluralities of third party data custodians in different subsets and may assign a customized system to search and monitor the data for each of the different subsets. The customization may be dependent on a level of the private data that is maintained and/or accessed by each third party data custodian.

The system may be enabled to allocate different levels of memory and bandwidth for monitoring the different subsets of third party data custodians. The amount of allocated memory and bandwidth may be dependent on the subset. The amount of allocated memory and bandwidth may be dependent on a time of day, month and/or year. The amount of allocated memory and bandwidth may be dependent on real-time actions and events occurring within the entity and/or each of the third party data custodians.

In some embodiments, the system may select a first subset of third party data custodians from the plurality of third party data custodians. The selecting of the first subset may include extracting from the plurality of third party data custodians, third party data custodians that have access to private data associated with the pre-determined entity. The first subset may also maintain within a database, private data associated with the pre-determined entity. The first subset may only have access to the private data and may not maintain the private data within their database.

In some embodiments the system may be configured to select a second subset of third party data custodians. The second subset may be a subset selected from the selected first subset of third party data custodians. The selecting may include extracting from the first subset, entity-related private data. The entity-related private data may be private data associated with the entity itself. The entity-related private data may be private data associated with employees of the entity. The private data may be accessed by the third party data custodians. The private data may be maintained and stored within a third party data custodian network.

The system may be configured, for the second subset of third party data custodians, to increase a monitoring of these selected second subset of third party data custodians. The monitoring may be more frequently than a rate of monitoring the selected first subset of third party data custodians.

Depending on a level of privacy of the data, the monitoring may be increased. Periodically monitoring public data may be once or twice a day. Periodically monitoring private data may be increased to four to five times a day. Periodically monitoring private data may be increased to once every sixty minutes.

For the second subset of third party data custodians, the system may be configured to increase the periodic searching of dark web users communications, for communications comprising identifying text associated with the second subset of third party data custodians.

In some embodiments, the system may be configured to select a third subset of third party data custodians. The third subset may be a subset selected from the selected first subset of third party data custodians. The selecting may include extracting from the first subset of third party data custodians, third party data custodians that have access to customer-related private data. The customer-related private data may be data associated with customers of the pre-determined entity. The selecting may include extracting from the first subset of third party data custodians, third party data custodians that maintain the pre-determined entity's customer-related private data.

The pre-determined entity may prefer a greater rate of monitoring for selected third subset of third party data custodians since the third subset of third party data custodians maintain and/or access private data associated with customers of the entity. In some embodiments the system may be configured to increase the periodic searching at a greater frequency. In some embodiments, the system may be configured to increase the searching to a continuous searching.

In another embodiment, a method for reducing a level of private data exposure, associated with a third party data custodian, via the dark web, is provided. The method may enable monitoring a slope of an appearance of third party data custodians within the dark web. The appearances may be through dark web blogs and website communications.

The monitoring of the slope may be based on a rate of change per unit of time of identification of each identifying text. An increase in the slope may indicate a greater level of private data exposure. The increase in the slope may enable advanced warning by providing ample time to initiate additional security measures to protect the private data prior to a breach of the data.

The method may include searching, periodically, the dark web users communications using a text-search analysis engine located on a centralized server. The searching may enable retrieving communications that may include text identifying the selected third party data custodian.

Simultaneous to the searching, the method may include running a time clock. The time clock may be executed by a processor on the centralized server. The time clock may be configured to stamp an exact time of identification of each identifying text. The time clock may be set to start the searching at a start time of zero hours, zero minutes and zero seconds. For each interval in which identifying text is identified, the time stamp may be calculated based off of the previous time stamp.

During the searching, the method may include identifying one or more communications including the identifying text. For each identifying text, the method may include increasing a total name count by one digit for the selected third party data custodian.

The method may also include, for each identifying text, assigning a time-stamp of a time of identification of each identifying text.

When a rate per unit of time of identification of each identifying text is equal to or greater than a pre-determined rate per unit of time, the method may include increasing a monitoring of the dark web for communications comprising text identifying the selected third party data custodian.

In some embodiments, when the rate per unit of time of identifying text is equal to or greater than the pre-determined rate per unit of time, the method may include locking the private data residing within a network of the selected third party data custodian from external access.

The method may further include, following the identifying, retrieving the one or more communications including the identifying text and analyzing the one or more communications, using sentiment analysis, to identify one or more keywords linking to the level of the private data exposure. When one or more keywords are identified, the method may further include increasing a monitoring of the private data. The increasing may include searching, continuously, the dark web users communications for additional communications comprising identifying text.

In some embodiments, the method may monitor the identifying texts using a window of time. The window of time may be a pre-determined window of time. When the time clock reaches the pre-determined window of time, the method may include calculating the amount of identified texts identified within the pre-determined window of time and further determining a slope between each identifying text. When the slope is equal to or greater than a pre-determined trigger slope, the method may perform measures of security to secure the private data.

It should be appreciated that the method may include using artificial intelligence ("AI") to adjust the trigger slope. The method may include adjusting the trigger slope by comparing previously determined trigger slopes and the level of success of protection of the private data based off of those trigger slopes.

A cluster of communications may be identified within a single location. The cluster of communications may be a plurality of communications all including text identifying a selected third party data custodian. The single location may be a website, weblog, specific URL and any other suitable location within the dark web.

When the cluster of communications within the single location are identified to include identifying text and every communication within the cluster of communications is identified to have occurred within a pre-determined period of time, the method may further include increasing a monitoring at the single location. The pre-determined period of time may be between zero and sixty minutes. The pre-determined time period may be between zero and thirty minutes. The pre-determined time period may be less than twenty minutes.

In some embodiments, a dark web monitoring system for monitoring dark web users communications within a dark web portion of the internet is provided. In this embodiment, the dark web monitoring system may be configured to monitor a rate in a change per unit of time of communications associated with one or more selected third party data custodians identified on the dark web.

The dark web monitoring system may include a central server associated with the pre-determined entity. The central server may include a text-analysis search engine configured to search, periodically, the dark web for communications comprising text identifying the selected third-party custodian.

The text-analysis engine may be configured to identify one or more communications comprising identifying text.

The system may also include a time clock configured to, simultaneous to the search, assign a time-stamp of a time of identification of each identifying text within each communication.

The system may also include at least one processor coupled to a memory and configured to retrieve, in real-time, from the text-analysis search engine, the one or more communications comprising identifying text. The processor may also be enabled to retrieve the time-stamp for each identifying text.

The processor may be configured to, for each identifying text, increase by one digit a total name count occurrence counter for the selected third party data custodian.

When a rate per unit of time of identifying text is equal to a pre-determined rate per unit of time, the system may be enabled to increase a monitoring of the dark web for communications comprising text identifying the selected third party data custodian.

When the rate per unit of time of identifying text is equal to or greater than double the pre-determined rate per unit of time, the system may be configured to lock down the private data associated with the selected third party data custodian from external access.

The system may also be configured to store, in a database within the central server, the one or more communications comprising the identifying text. By storing the communications, the system may be enabled to perform a deeper analysis of the sentiment of the communications.

When performing a sentiment analysis on the one or more communications, the system may identify negative sentiment data. For each communication including negative sentiment data, the system may be enabled to increase a total negative sentiment communication occurrence counter by one digit.

When a percentage of the total name count occurrence counter divided by the total negative sentiment communication occurrence counter is equal to or greater than a pre-determined percentage, the system may be configured to increase a monitoring of the private data by searching, continuously, the dark web users communications for additional communications comprising identifying text and negative sentiment data.

When a cluster of communications within a single location are identified within a pre-determined shortened period of time, the system may be further configured to increase a monitoring at the single location. Such increase in monitoring may include searching the single location continuously. Such increase in monitoring may also include analyzing further, the cluster of communications identified within the single location, for negative sentiment data.

In some embodiments, the system may perform a search for a selected single third party data custodian in order to ensure the private data is secure. In other embodiments, the system may select a plurality of third party data custodians. The entity may include a third-party data custodian library stored on a database within the central server. The library may include a list of a plurality of third party custodians linked to the entity. The third party data custodian library may include a plurality of tiers of third party custodians. Each tier may include a subset of the plurality of third party data custodians. The system may perform different methods for securing the private data within each subset.

The library may include a first subset of third party data custodians that have access to private data associated with the pre-determined entity and/or maintain within a database, private data associated with the pre-determined entity.

The library may include a second subset of third party data custodians. The second subset may be a subset of the first subset of third party data custodians. The second subset may include third party data custodians that have access to entity-related private data and/or maintain entity-related private data.

The third subset of third party data custodians may be a subset of the first subset. The third subset may include third party data custodians that have access to customer-related private data and/or maintain customer-related private data.

The system may be configured to select a plurality of third party data custodians from the third party data custodian library and search the dark web for identifying text associated with each of the plurality of third party data custodians.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative diagram of a dark web portion 104 of the internet 102. The dark web 104 may illustrate display points of communication. Each illustrative display point of communication may indicate an identified text of the selected third party data custodian. The display points of communications may be identifiable in any suitable fashion. It may be identifiable by the server that may generate and transmit the communications to the locations where they are transmitted. They may be identifiable by a distribution list. Additionally, they may be identifiable by a subject matter line of a communication.

In this illustrative diagram 100, the selected third party data custodian may be, for example, Company X. When searching the dark web for communications including text identifying Company X, a total of 28 communications 106 may be identified within a period of time.

Some of communications 106 may be within close proximity on the dark web 104. Some communications may be scattered across the dark web 104. Each of communications 106 may increase the total counter for the selected third party custodian.

Communications 106 that are within close proximity may be within the same location. A location may include but may not be limited to, a website, blog and chat-room. Communications 106 that may be in close proximity and may all be linked to a single chatter. This may increase a greatness of an alert the system may transmit to the pre-determined entity associated with the selected third party data custodian—company X. When an increase of communications may be identified within the same location, this may identify a greater probability of a level of potential security breach on pre-determined entity data located within the selected third party data custodian.

Communications 106 that may not be within close proximity may each be identified in a different location within the dark web 104. In some embodiments, each single communication 106 may be insignificant. In some embodiments, a single communication that may be monitored over time may be determined to increase to a chatter of communications between dark web users that may rapidly transform into a serious threat.

In some embodiments, the system may identify members of a group chat and may identify clusters of communications that may not be included in one location. Each member may be at different locations but may be identifiable as a cluster.

It should be appreciated that each of communications 106, whether distant and/or close may be identified, captured, retrieved and stored within the system for further analyzing.

In some embodiments, lines 108 and 110 crossing through the illustrative dark web 104 may depict a two-way communication between two users on the dark web that may be transmitting and receiving communications about the third party data custodian. The system may then continue to search the dark web in other locations for communications linking to the two users.

Figure 2:
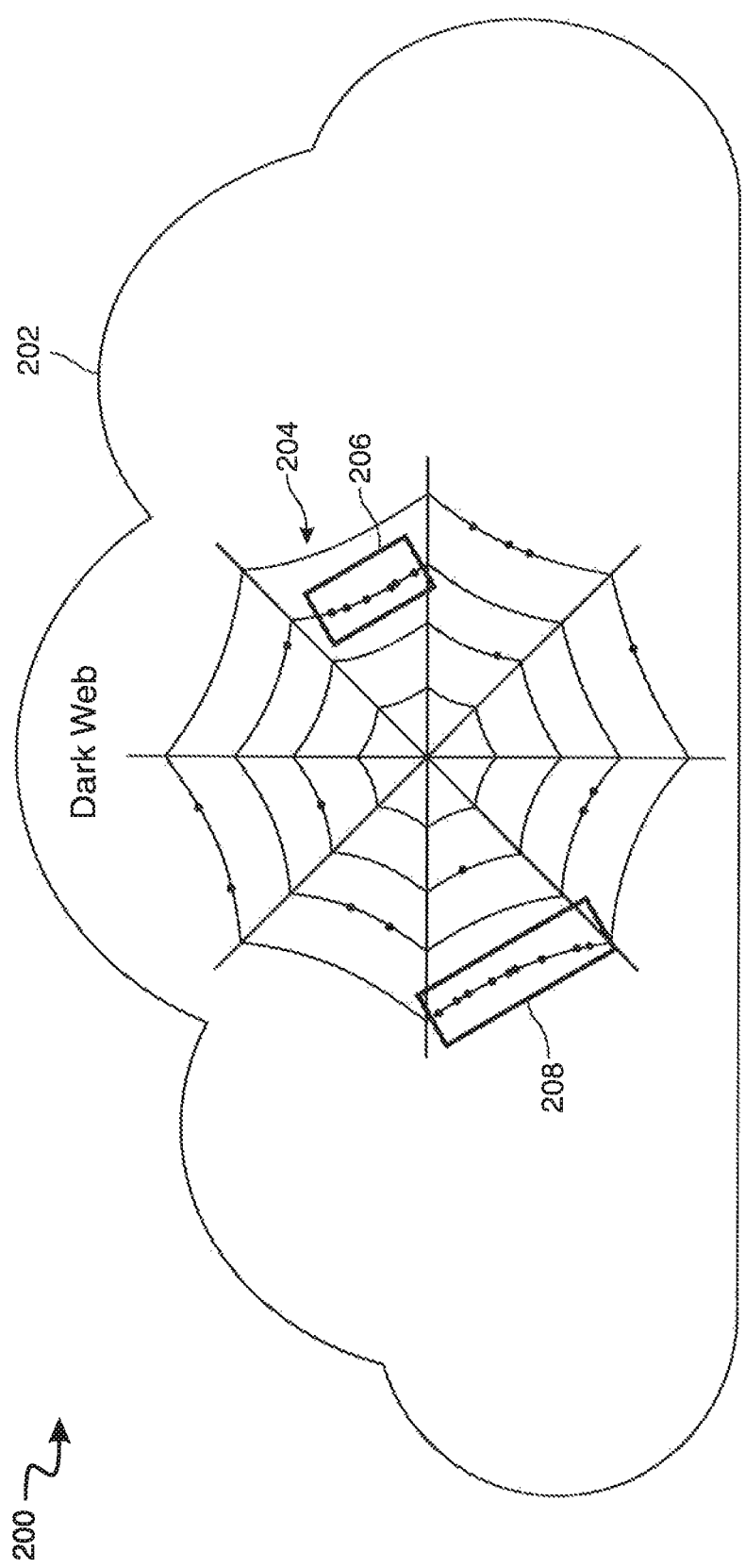
FIG. 2 shows an illustrative diagram in accordance with principles of the disclosure.

FIG. 2 shows an illustrative diagram 200 of the dark web portion 204 of the internet 202. Diagram 200 may be the same diagram displayed in FIG. 1. In this exemplary diagram each communication may be identified that may include text identifying the selected third party data custodian. Additionally, clusters of communications may also be identified.

Each of exemplary clusters 206 and 208 may include a plurality of communications with text identifying the selected third party data custodian—Company X. Cluster 206 may include communications that all are determined to be located within one location. Cluster 208 may also include communications that may all be determined to be located within one location. Cluster 206 and 208 may be two separate locations within the dark web.

The system may be configured to, when identifying a cluster, to increase surveillance within the location of the cluster. The increasing of surveillance may include monitoring at a more frequent rate, the communications within the location. The monitoring may begin at a first periodic rate which may be once a day, or a couple times a day. The increasing of the monitoring, may increase the monitoring to a second periodic rate. The second periodic rate may be a rate of six times a day. The second period rate may be once per hour. The monitoring may additionally include monitoring, more frequently, the locations that may be linked to the location of each of the clusters.

When a cluster is identified within a web site, the system may be configured to continuously monitor the chatter occurring within the website. The system may also be configured to monitor additional websites that may be included as hyperlinks within the website. The system may also be configured to monitor additional websites/blogs that may be advertised on the webpages of the website.

Figure 3:
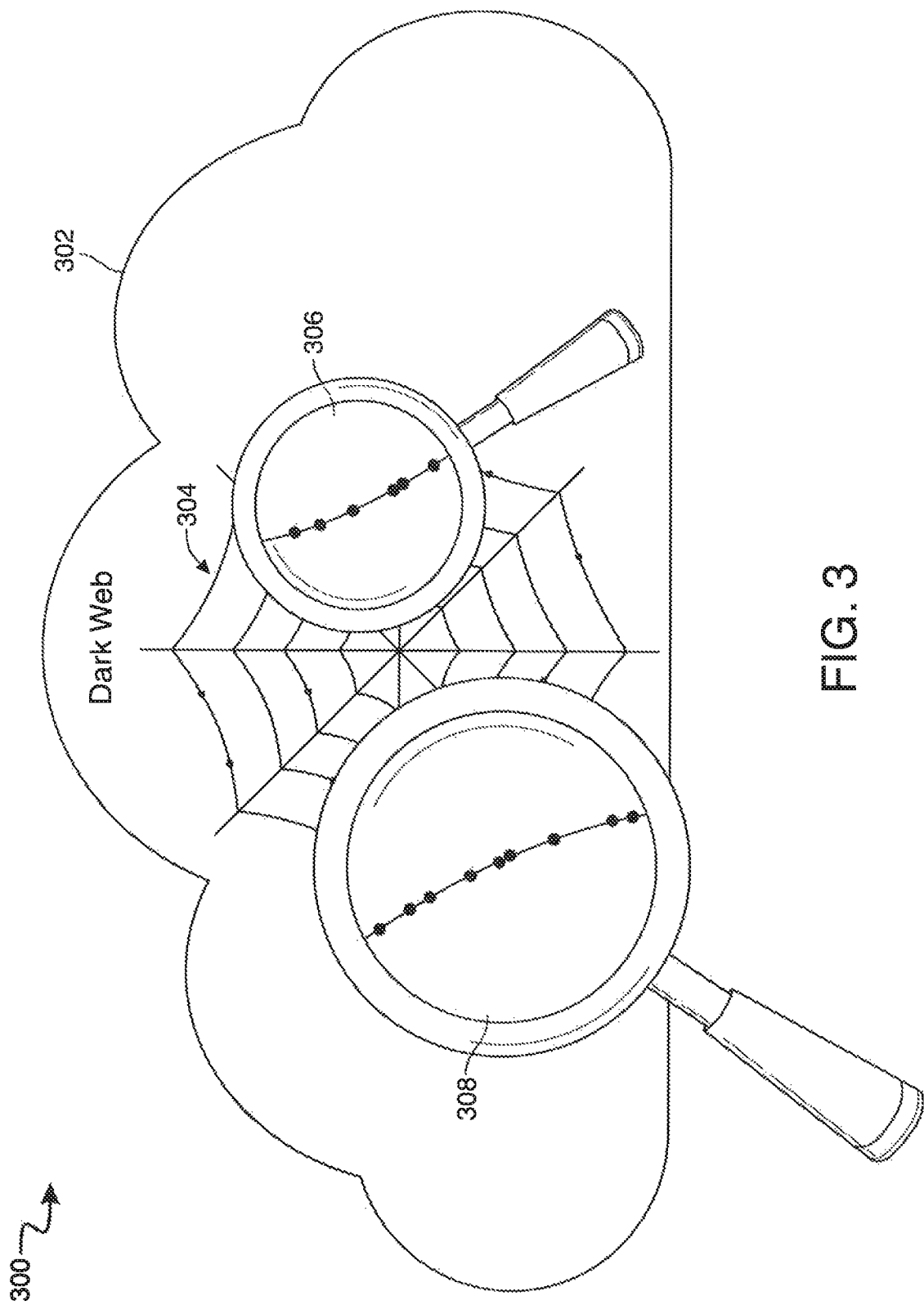
FIG. 3 shows an illustrative diagram in accordance with principles of the disclosure.

FIG. 3 shows an illustrative diagram 300 of the dark web portion 304 of the internet 302. Diagram 300 illustrates the identified clusters of communications 206 and 208 identified in FIG. 2.

The system may, in some embodiments, magnify or otherwise enhance the surveillance of the locations. The magnifying of the surveillance may include increasing the monitoring of the clusters 206 and 208 from a periodic monitoring to a continuous monitoring of the locations where the clusters may be identified.

In some embodiments, the magnifying the surveillance may include monitoring additionally for the sentiment of the communications within the locations. The system may use applications, software and/or hardware described in FIGS. 5, 6 and 7 for sentiment analysis. When determining negative sentiment within the communications comprising identifying text of the third party data custodian, monitoring may be heightened significantly.

The increasing of the monitoring may include increasing the monitoring by an order of magnitude for each of the plurality of third party data custodians being monitored. The increasing may include increasing the surveillance of the location within the dark web. The increasing may include increasing the surveillance of locations surrounding the single location. A location may be a website, web blog, URL, and any other suitable location within the dark web. When increasing the surveillance of surrounding locations, this may include web pages that may be embedded and hyperlinked within the website.

The hackers may be enabled to identify outsiders monitoring the behavior and may attempt to protect their activity or strike back at the entity. By monitoring the surrounding locations, the system may be enabled to continue to follow the activity even in the presence of defensive activities.

In some embodiments, when negative sentiment is identified, the system may increase the measures for prevention of security breach by withdrawing the pre-determined entity's data from the selected third party data custodian.

Figure 4:
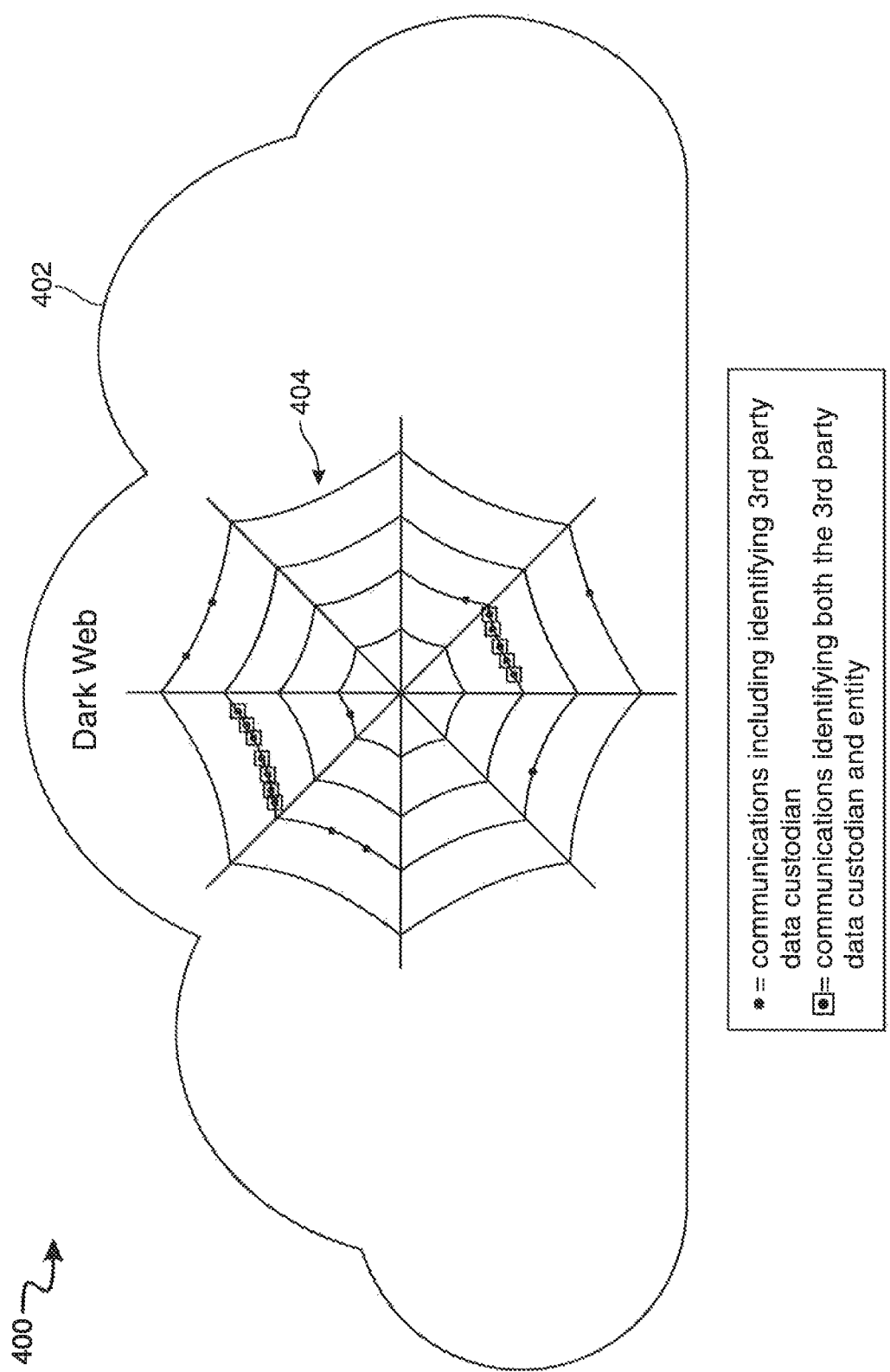
FIG. 4 shows an illustrative diagram in accordance with principles of the disclosure.

FIG. 4 shows another illustrative diagram 400 of communications on the dark web 404 within the internet 402.

In this diagram 400, the system may search for and identify communications on the dark web that may include a combination of parameters. The first parameter may be text identifying the third party data custodian. The second parameter may be text identifying the pre-determined entity.

Communications 406 may be communications identifying the third party data custodian. Communications 408 may be communications identifying a combination of the third party data custodian and the predetermined entity.

The system may be configured to monitor and calculate each point of communication. Communications including identifying text of the third party data custodian may be included in a first total. Communications including identifying text of the entity may be included in a second total. The communications including a combination of both the text identifying the third party data custodian and the entity may be included in a third total.

When both the third party data custodian and the entity are included within a communication, this may indicate that the entity is at a greater risk of data breach.

The system may, in some embodiments, increase the monitoring of the locations where the combination is identified. In other embodiments, when a communication is identified to include at least two or more texts identifying the entity, the system may withdraw and/or lock the private data from external access.

Figure 5:
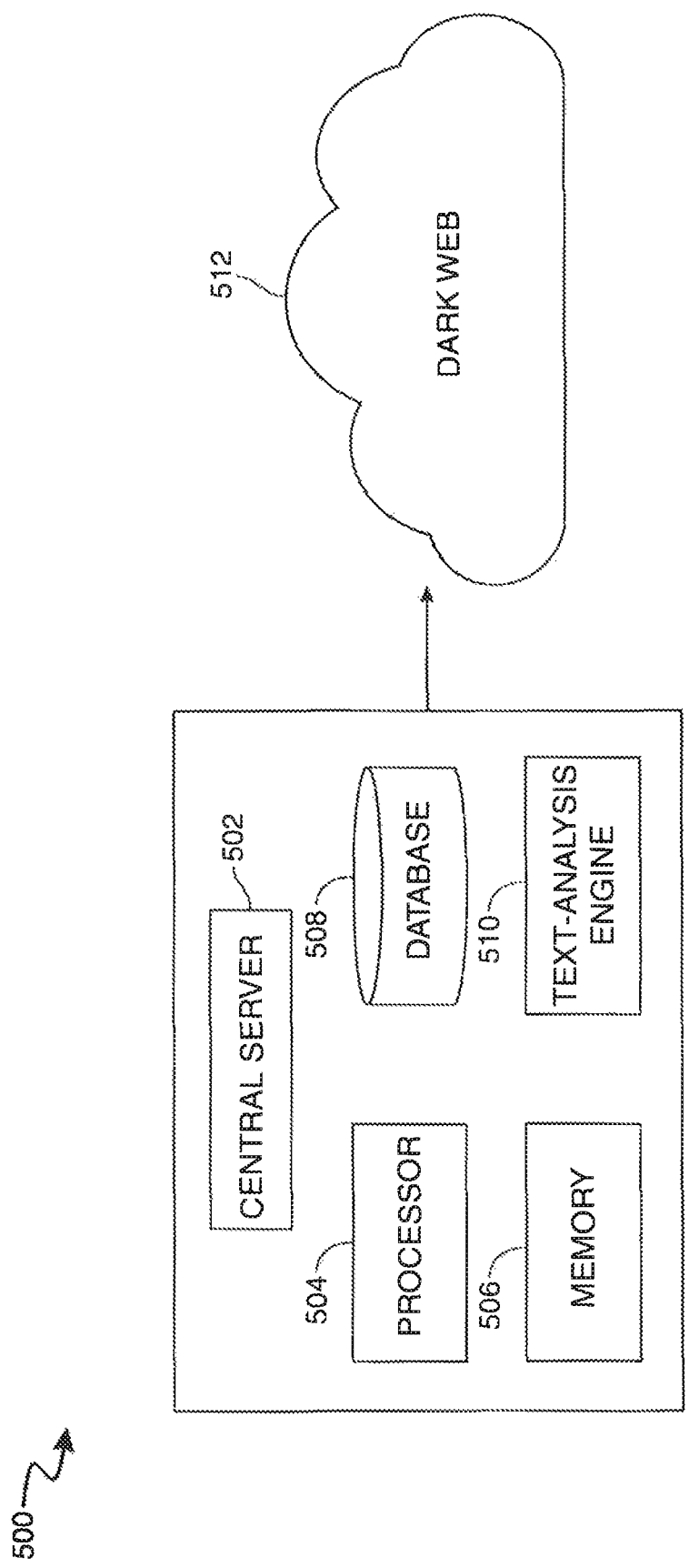
FIG. 5 shows a system architecture in accordance with principles of the disclosure.

FIG. 5 shows a system 500 monitoring the dark web 512, in accordance with principles of the disclosure. The system 500 may be a system of the entity for directly monitoring the dark web communications. System 500 may be a stand-alone system. System 500 may be a system in combination with the hardware, software and applications displayed and described in FIGS. 6 and 7.

System 500 may include a central server 502. Server 502 may be associated with the entity and may be used to monitor the dark web. Server 502 may also manage and handle all the data associated with the entity.

System 500 may also include a processor 504 configured to process all the information, communications and data received from the dark web 512. The system 500 may also include memory 506, database 508 and text-analysis engine 510.

Text-analysis engine 510 may be an application that may be configured to crawl the world wide web and more directly, the dark web, and identify communications that may indicate a probability of an attempt to hack private data associated with the entity.

Figure 6:
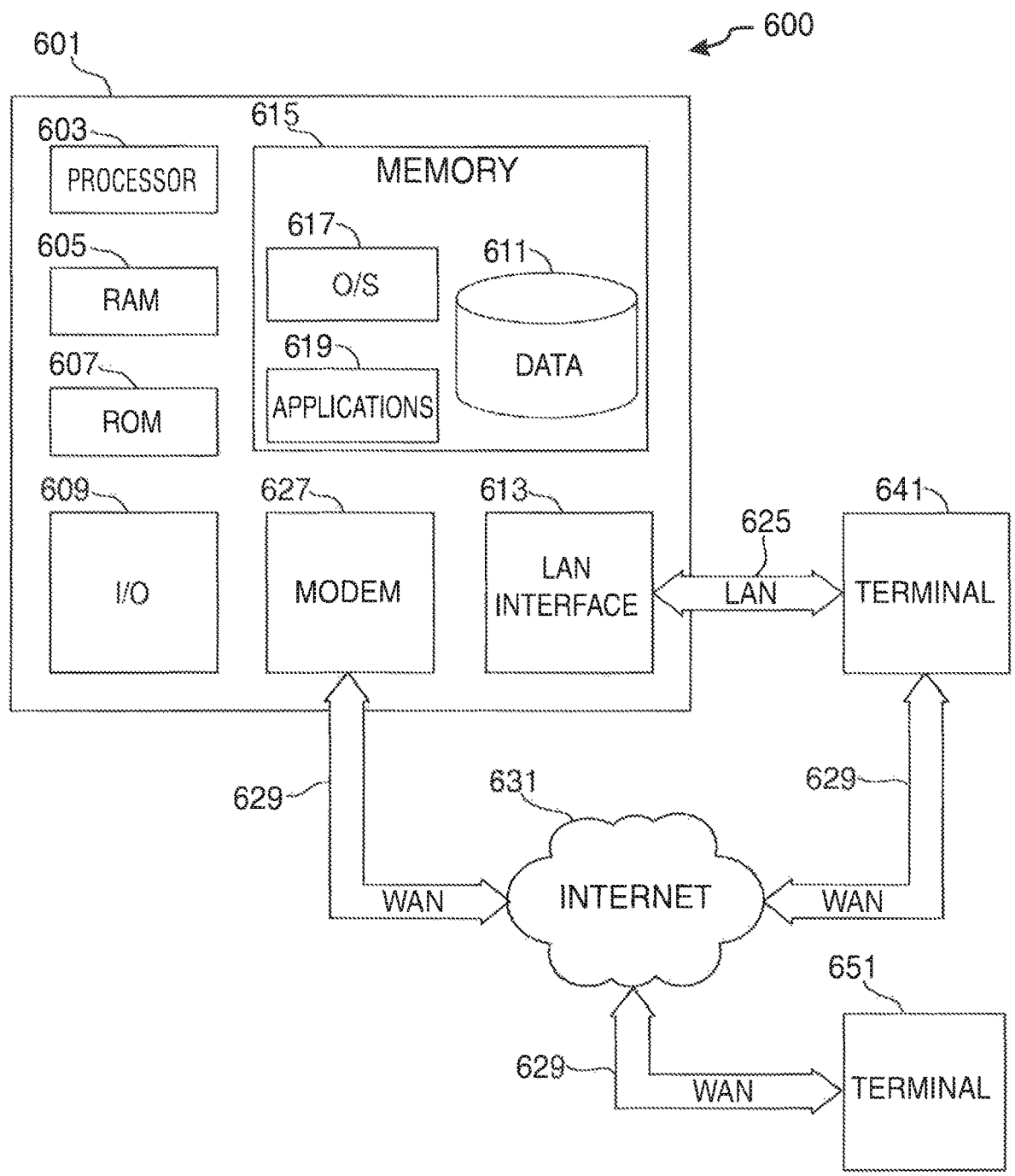
FIG. 6 shows a system architecture in accordance with principles of the disclosure.

FIG. 6 shows an illustrative block diagram of system 600 that includes computer 601. Computer 601 may alternatively be referred to herein as a "server" or a "computing device." Computer 601 may be a desktop, laptop, tablet, smart phone, or any other suitable computing device. Elements of system 600, including computer 601, may be used to implement various aspects of the systems and methods disclosed herein.

Computer 601 may have a processor 603 for controlling the operation of the device and its associated components, and may include RAM 605, ROM 607, input/output module 609, and a memory 615. The processor 603 may also execute all software running on the computer—e.g., the operating system and/or voice recognition software. Other components commonly used for computers, such as EEPROM or Flash memory or any other suitable components, may also be part of the computer 601.

System 600 may be used in conjunction with the system architecture described in FIG. 5. System 600 may be a separate system from the system described in FIG. 5. System 600 may enable the monitoring of the dark web as described throughout the disclosure.

The memory 615 may be comprised of any suitable permanent storage technology—e.g., a hard drive. The memory 615 may store software including the operating system 617 and application(s) 619 along with any data 611 needed for the operation of the system 600. Memory 615 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 601 may execute the instructions embodied by the software to perform various functions.

Input/output ("I/O") module may include connectivity to a microphone, keyboard, touch screen, mouse, and/or stylus through which a user of computer 601 may provide input. The input may include input relating to cursor movement. The input/output module may also include one or more speakers for providing audio output and a video display device for providing textual, audio, audiovisual, and/or graphical output. The input and output may be related to computer application functionality.

System 600 may be connected to other systems via a local area network (LAN) interface 613.

System 600 may operate in a networked environment supporting connections to one or more remote computers, such as terminals 641 and 651. Terminals 641 and 651 may be personal computers or servers that include many or all of the elements described above relative to system 600. The network connections depicted in FIG. 6 include a local area network (LAN) 625 and a wide area network (WAN) 629 but may also include other networks. When used in a LAN networking environment, computer 601 is connected to LAN 625 through a LAN interface or adapter 613. When used in a WAN networking environment, computer 601 may include a modem 627 or other means for establishing communications over WAN 629, such as Internet 631.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system because the retrieval may be faster than data-streaming. Conventionally, streaming data requires heavy usage of the processor and the cache memory. If the data is stored in the computer system's memory, retrieval of the data may not require heavy processor and cache memory usage. Any of various conventional web browsers can be used to display and manipulate retrieved data on web pages.

Additionally, application program(s) 619, which may be used by computer 601, may include computer executable instructions for invoking user functionality related to communication, such as e-mail, Short Message Service (SMS), and voice input and speech recognition applications. Application program(s) 619 (which may be alternatively referred to herein as "plugins," "applications," or "apps") may include computer executable instructions for invoking user functionality related performing various tasks. The various tasks may be related to transmitting, tracking, authorizing, and/or controlling charitable donations.

Computer 601 and/or terminals 641 and 651 may also be devices including various other components, such as a battery, speaker, and/or antennas (not shown).

Terminal 651 and/or terminal 641 may be portable devices such as a laptop, cell phone, Blackberry™, tablet, smartphone, or any other suitable device for receiving, storing, transmitting and/or displaying relevant information. Terminals 651 and/or terminal may be other devices. These devices may be identical to system 600 or different. The differences may be related to hardware components and/or software components.

Any information described above in connection with database 611, and any other suitable information, may be stored in memory 615. One or more of applications 619 may include one or more algorithms that may be used to implement features of the disclosure, and/or any other suitable tasks.

The invention may be operational with numerous other general purposes or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network.

In a distributed computing environment, program modules may be located in both local and remote computer storage media including memory storage devices.

Figure 7:
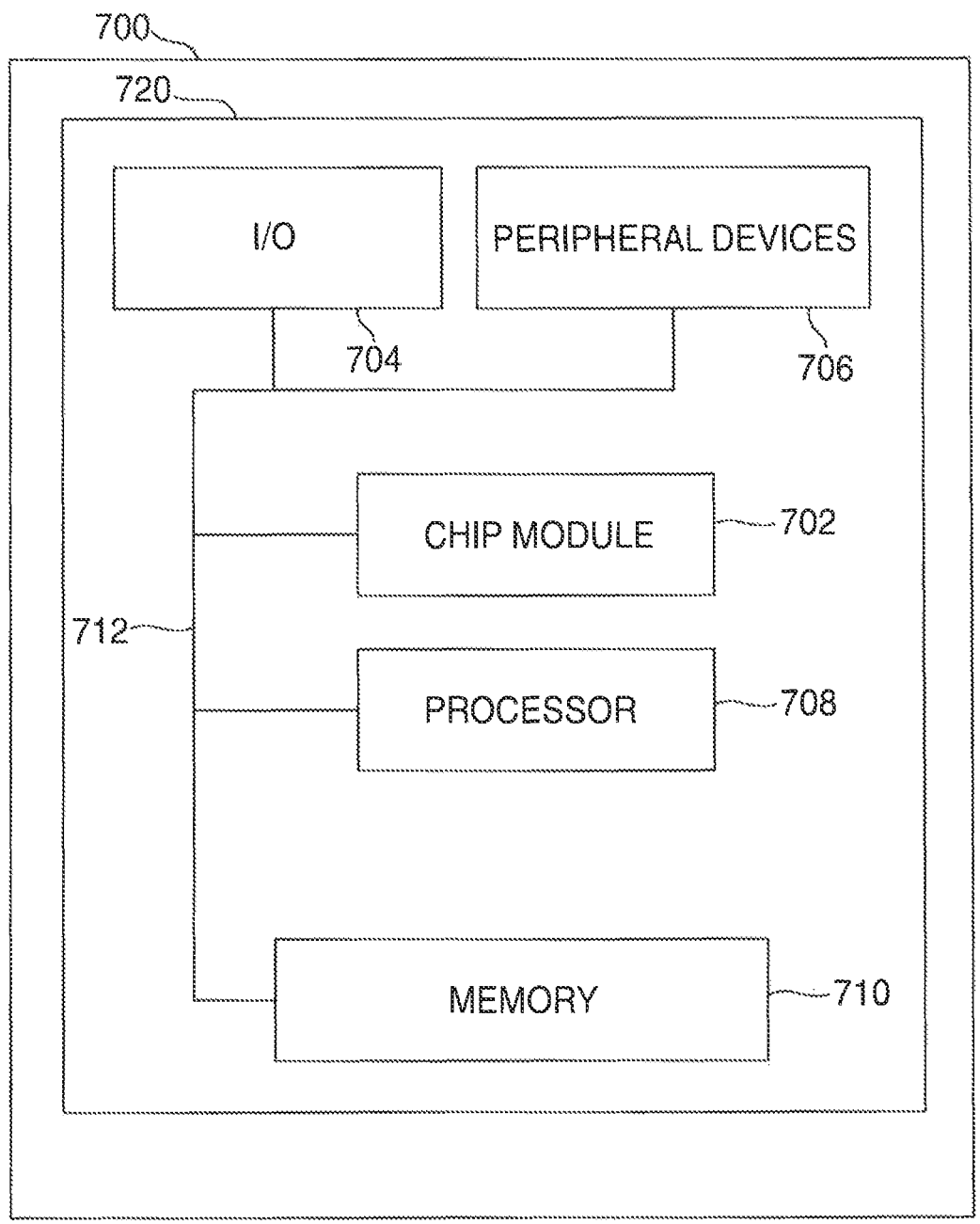
FIG. 7 shows a system architecture in accordance with principles of the disclosure.

FIG. 7 shows illustrative apparatus 700 that may be configured in accordance with the principles of the disclosure. Apparatus 700 may be a computing machine. Apparatus 700 may include one or more features of the apparatus shown in FIG. 5. Apparatus 700 may include chip module 702, which may include one or more integrated circuits, and which may include logic configured to perform any other suitable logical operations.

Apparatus 700 may include one or more of the following components: I/O circuitry 704, which may include a transmitter device and a receiver device and may interface with fiber optic cable, coaxial cable, telephone lines, wireless devices, PHY layer hardware, a keypad/display control device or any other suitable media or devices; peripheral devices 706, which may include counter timers, real-time timers, power-on reset generators or any other suitable peripheral devices; logical processing device 708, which may computer data structural information and structural parameters of the data; and machine-readable memory 710.

Machine-readable memory 710 may be configured to store in machine readable data structures: machine executable instructions (which may be alternatively referred to herein as "computer instructions" or "computer code"), applications, signals, and/or any other suitable information or data structures.

Components 702, 704, 706, 708 and 710 may be coupled together by a system bus or other interconnections 712 and may be present on one or more circuit boards such as 720. In some embodiments, the components may be integrated into a single chip. The chip may be silicon-based.

Figure 8:
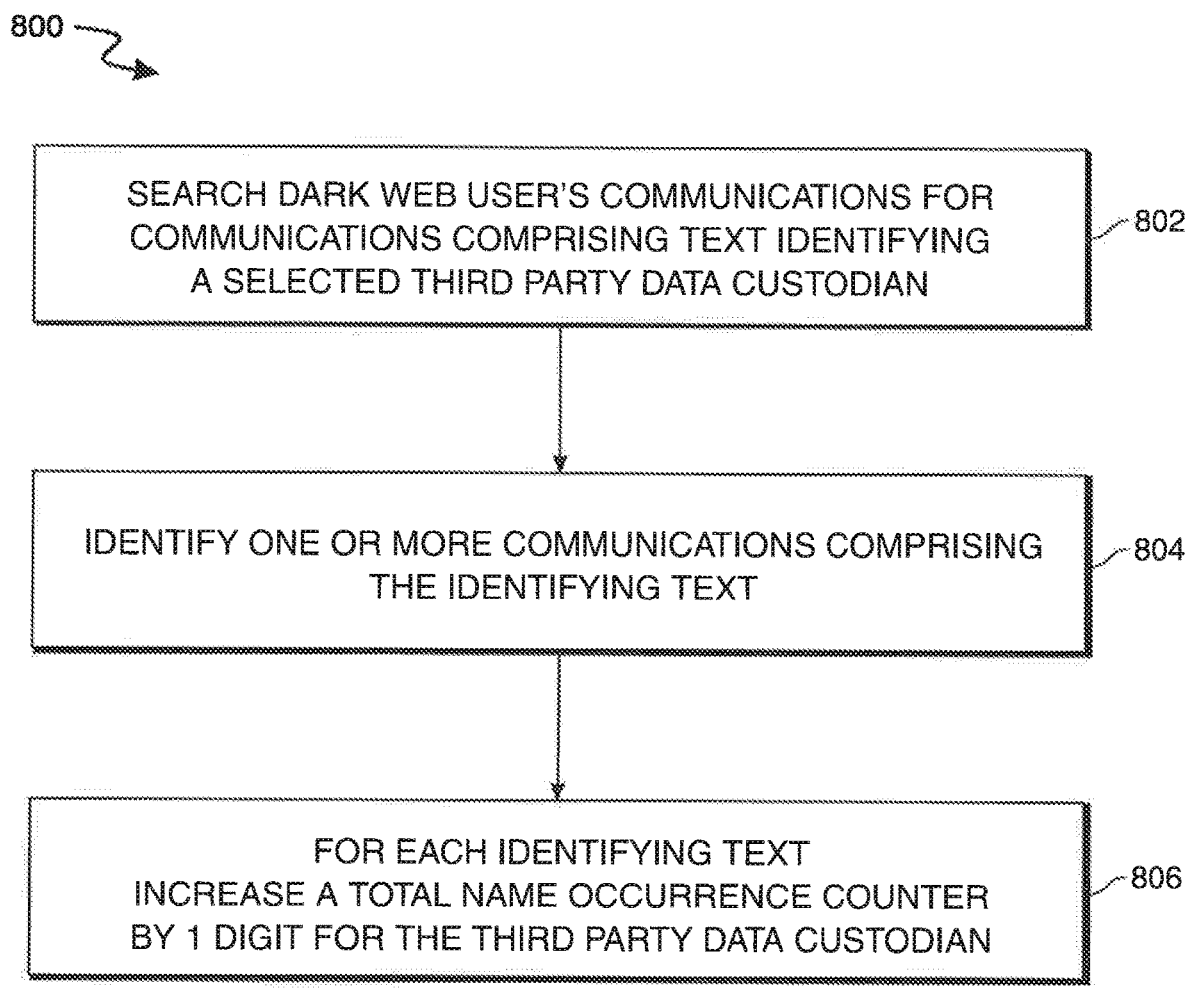
FIG. 8 shows a flowchart in accordance with principles of the disclosure.

FIG. 8 shows a flowchart 800 of the method for identifying a level of private data exposure associated with a selected third party data custodian in accordance with principles of the disclosure.

At step 802, the method may include searching the dark web users communications for each communication comprising text that may identify a selected third party data custodian.

At step 804, the method may include identifying one or more communications that may include the identifying text.

At step 806, the method may include, for each communication including the identifying text, to increase a total name occurrence counter for the third party data custodian, by one digit.

Figure 9:
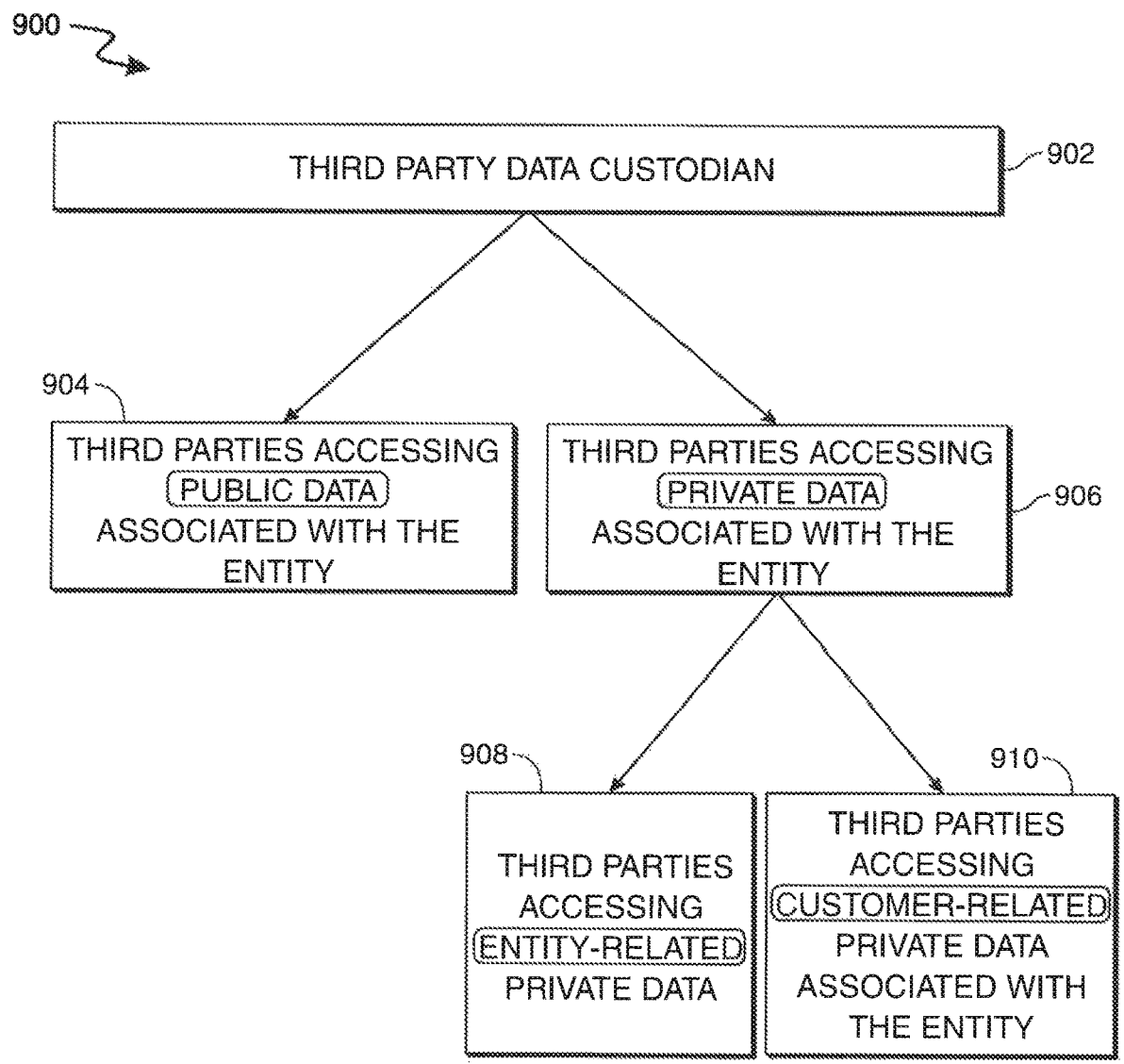
FIG. 9 shows an exemplary diagram in accordance with principles of the disclosure.

FIG. 9 shows a third party data custodian library 900 in accordance with principles of the disclosure. At 902, the system may store a library of all third party data custodians that may be associated with the pre-determined entity.

Third party custodians that may handle data of the pre-determined entity may be associated with different various forms of data. Some third party data custodians may handle public data. Some third party data custodians may handle and manage private data. Some custodians may handle both public and private data. Whatever data each third party data custodian may maintain, they may have access to and/or physically store the data within their own systems.

At 904, a first subset of data associated with third parties may be stored. This subset may include third parties that may only access and/or maintain publicly available data associated with the entity.

At 906, a second subset of data associated with third parties may be stored. This subset may include data associated with all third parties that may have any access to and/or maintain private data associated with the entity.

At 908, a third subset of data associated with third parties may be stored. This subset may be a subset of the second subset that may have access to and/or maintain entity-related private data.

At 910, a fourth subset of data associated with third parties may be stored. This subset may be a subset of the second subset. This subset may include third parties that may have access to and/or maintain customer-related private data.

It should be appreciated that the system may be configured to perform custom searches for identifying data on the dark web depending on the type of data the third party data custodian may handle.

Figure 10:
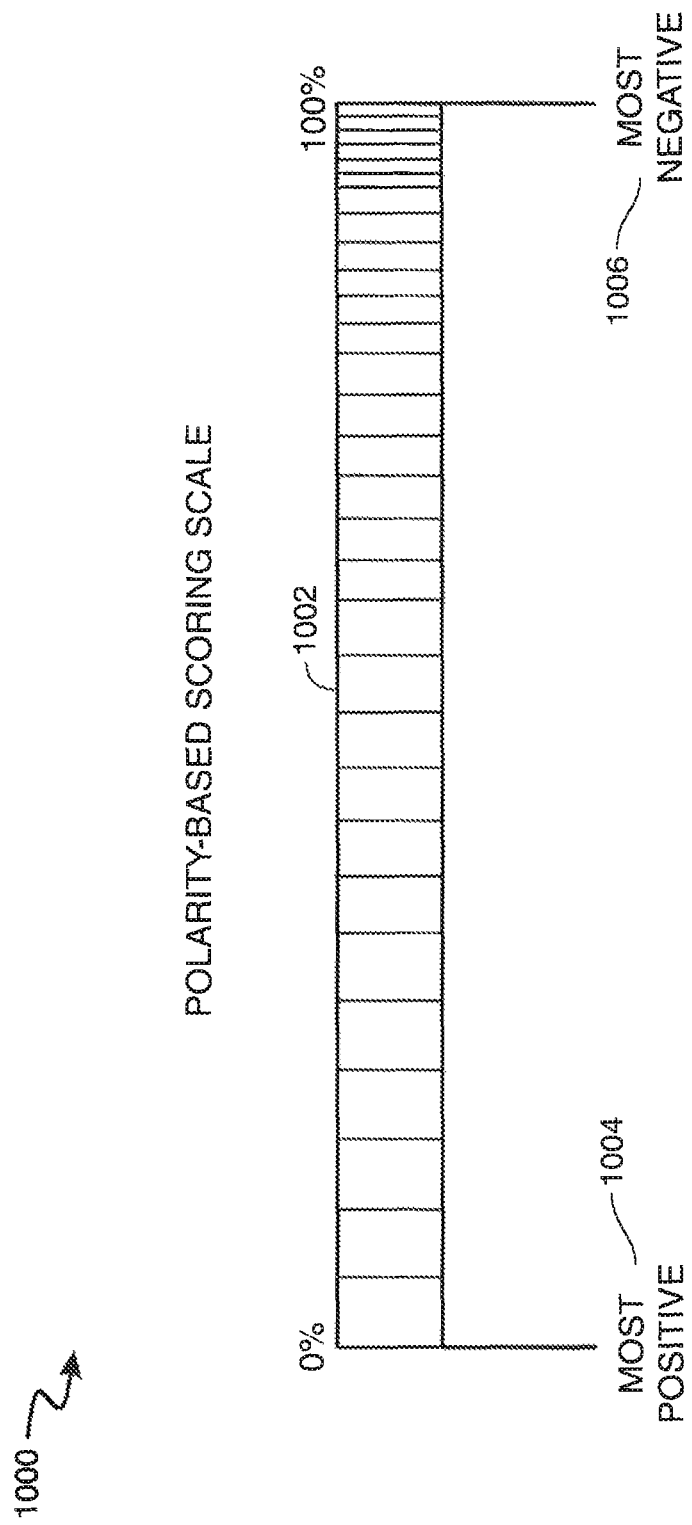
FIG. 10 shows an exemplary diagram in accordance with principles of the disclosure.

FIG. 10 shows an illustrative scoring scale. There may be various different methods or scales for scoring communications. For example, a communication may be scored based on positive or negative sentiment. A communication may be scored based on polar emotions, such as happy or sad. A communication may be scored in a non-polar 18 scale, such as a vector scaling model. A communication may be scored on a collection of multiple sentiment scoring methods or models.

Polarity-based scoring scale 1002 is shown in FIG. 10. In such a scoring scale, each communication is scored on a polar scale using linguistic scoring methodology.

Linguistic scoring methodology may utilize various language scoring methods, such as natural language processing, computational linguistics and biometrics. The language scoring methodology may also include text analysis. The text analysis may analyze various components of the text. It should be appreciated that, to a human reader, certain text components, such as sarcasm, exaggerations or jokes may be easily understood. However, a computer may require special methods to ensure that such linguistic terms are not misinterpreted. Therefore, the text analysis may analyze key words and phrases, emoticons, characters, length of response, response time between communications, related communications, negation, exaggeration, jokes and sarcasm. Based on the linguistic scoring methodology, each communication may be scored on a scale of 0% to 100%, as shown at 1004 and 1006. 0% may indicate most positive and 100% may indicate most negative.

It should be appreciated that a polarity-based scale 1004 may include two opposite emotions, whether positive 1006 and negative 1008, happy and sad or any other suitable opposite emotions. Therefore, each communication scored on a polarity-based score may only be given a score based on the polarity of the communication. However, at times, in order to compensate for the shortcomings of the polarity-based scoring models, a communication may be scored on multiple polarity-based scoring models, and, the results of the scoring models may be combined.

Communications, in accordance with some embodiments, may be scored to determine whether there may be any slight negative sentiment associated with the pre-determined entity. Therefore, for the safety and protection of the entity, the pre-determined threshold score for determining negative sentiment included in a communication may be as low as 10%. This pre-determined threshold may be used when performing a first search on the internet for negative sentiment associated with the pre-determined entity and/or the communication.

In certain embodiments, prior to alerting the pre-determined entity, the one or more instances of communications may be scored based on the level of negative sentiment included in the communication. The pre-determined threshold score for determining a level of negative sentiment on these communications may be raised to a higher percentage. The pre-determined threshold score may be 20%. The pre-determined threshold score may be 30%. In some instances, the pre-determined threshold score may be a percentage as low as 1% in order to protect high profile, private data.

Figure 11:
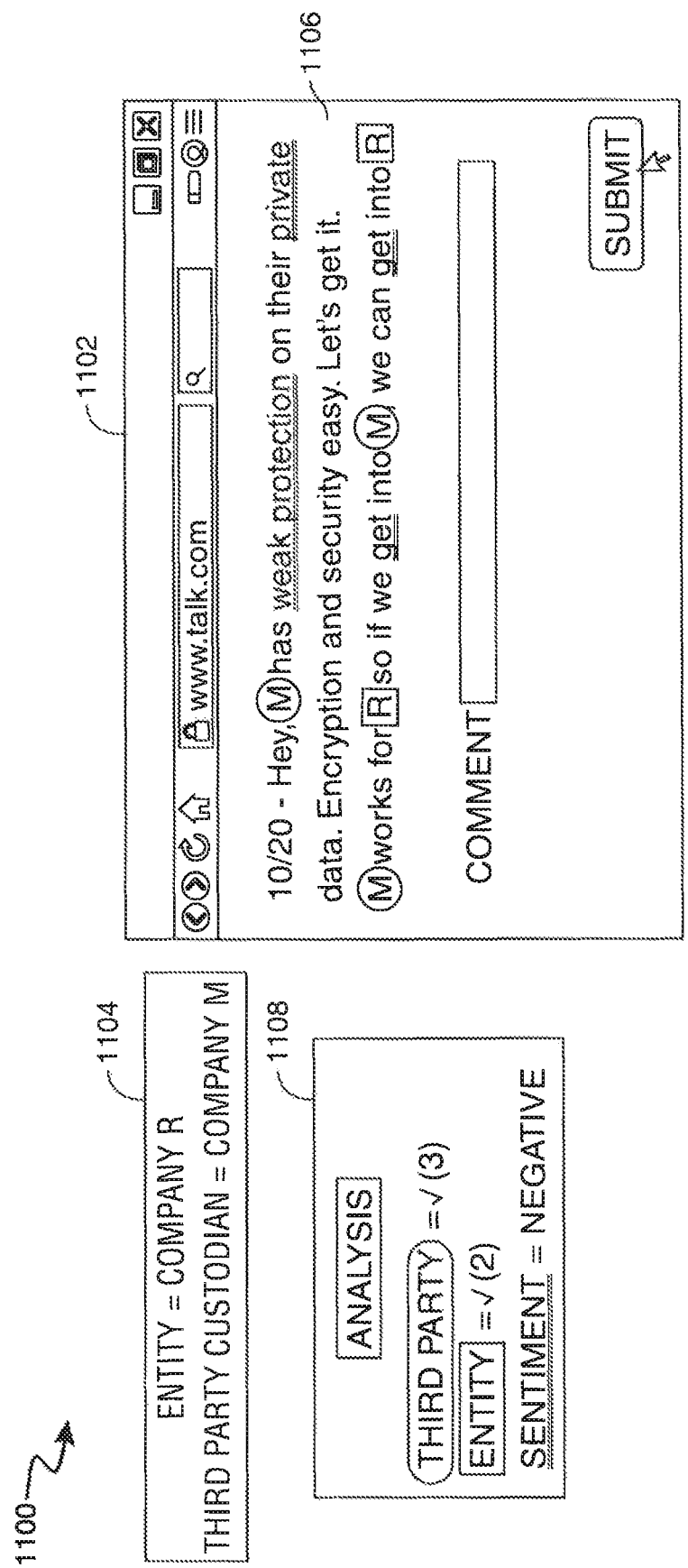
FIG. 11 shows an exemplary diagram in accordance with principles of the disclosure.

FIG. 11 shows an exemplary webpage 1102. Webpage 1102 may include communication 1106. Communication 1106 may be identified on a webpage within the dark web. Webpage 1102 may include communication 1106 that includes text identifying a selected third party data custodian.

Communication 1106 may be an exemplary communication identified by the text-analysis engine as described in FIG. 5. Communication 1106 may be identified as having a combination of both text identifying the third party data custodian and text identifying the entity.

In this example, the entity may be Company R and the third party data custodian may be Company M, as shown at 1104. Company M has been identified three times. Company R has been identified two times. When the combination is identified to be included in the communication, the system may further search the communication to analyze and determine the sentiment of communication 1106. In this example, the system may identify four words that may be negative sentiment.

Based on the analysis, as shown at 1108, the system may perform different measures to increase the security of the private data that may be stored at the Company M.

Figure 12:
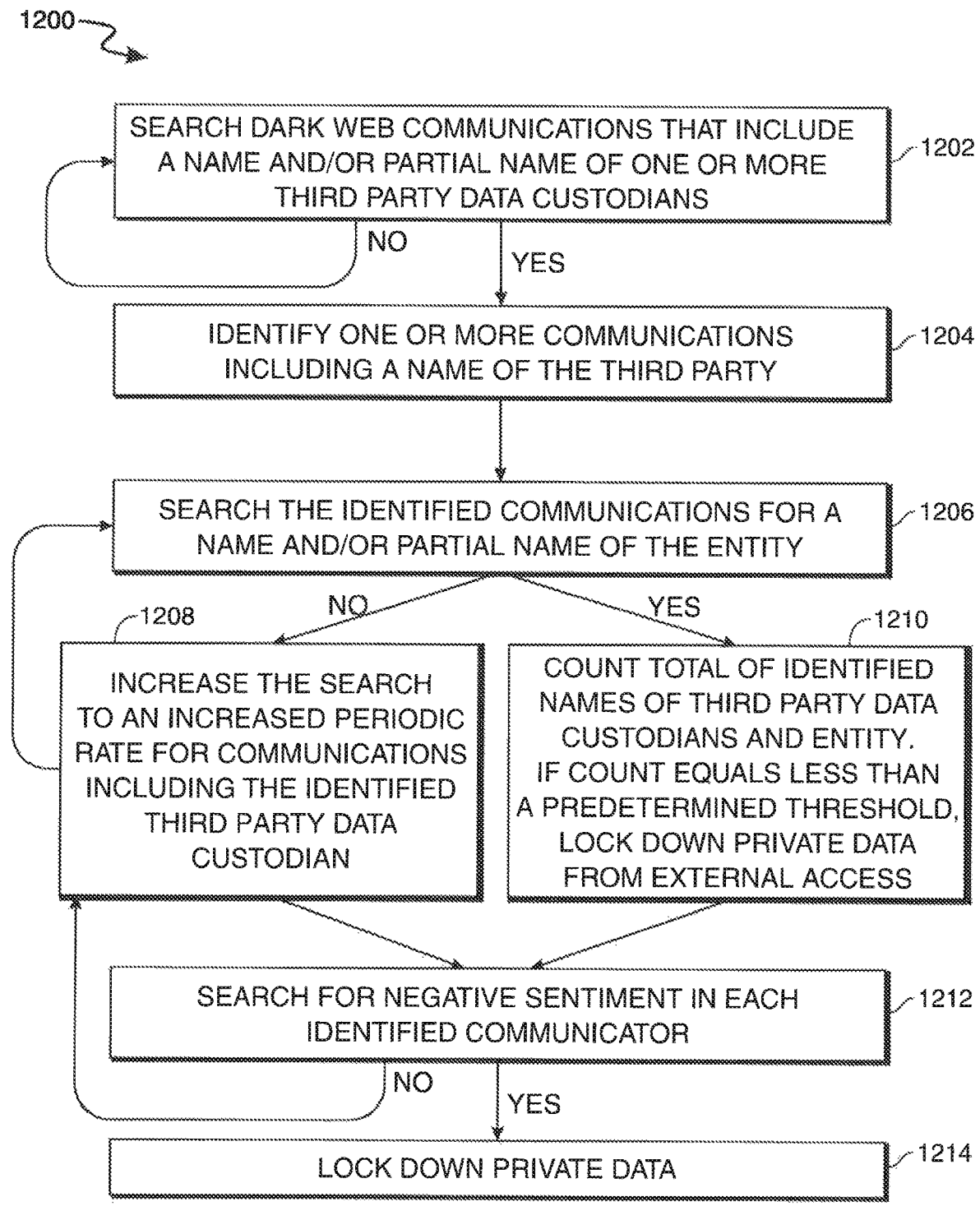
FIG. 12 shows an illustrative flowchart in accordance with principles of the disclosure.

FIG. 12 shows an exemplary flowchart 1200 of steps taken when performing a search.

At step 1202, the system may be configured to search the dark web for one or more communications that may include a name and/or partial name of one or more third party data custodians. When there are no communications identified, the system may repeat step 1202 and continue executing the search periodically to monitor the dark web.

At step 1204, the system may identify one or more communications that may include a name of at least one or more third party data custodians.

When the system identifies one or more third party data custodians, the system may continue to search the communications including the identified third party data custodians, for a name of the entity, as shown at 1206.

If the system does not identify text including the entity name, the system may continue to search for additional communications including the third party data custodians and additionally for text including the entity at an increased periodic search rate, using the steps shown at 1208.

Following step 1208, when the system does identify communication(s) including the name and/or partial name of the entity, the system may continue at step 1210. The system may be configured to count the total amount of identified names of the third party data custodian listed in the communication. The system may also be configured to count the total amount of identified names of the entity listed in the communication. The system may be configured to continuously sum the total of both the third party data custodians and the entity. When the total is equal to or greater than a pre-determined threshold, the system may lock down private data maintained within the third party data custodian, from external access.

At step 1212, the system may perform an additional search within the identified communication for negative sentiment.

When a pre-determined level of negative sentiment is identified, the system may automatically lock down all private data of the entity that may be accessed by the third party data custodian, as shown at 1214. In the event that negative sentiment is not identified, the system may return to step 1208.

Figure 13:
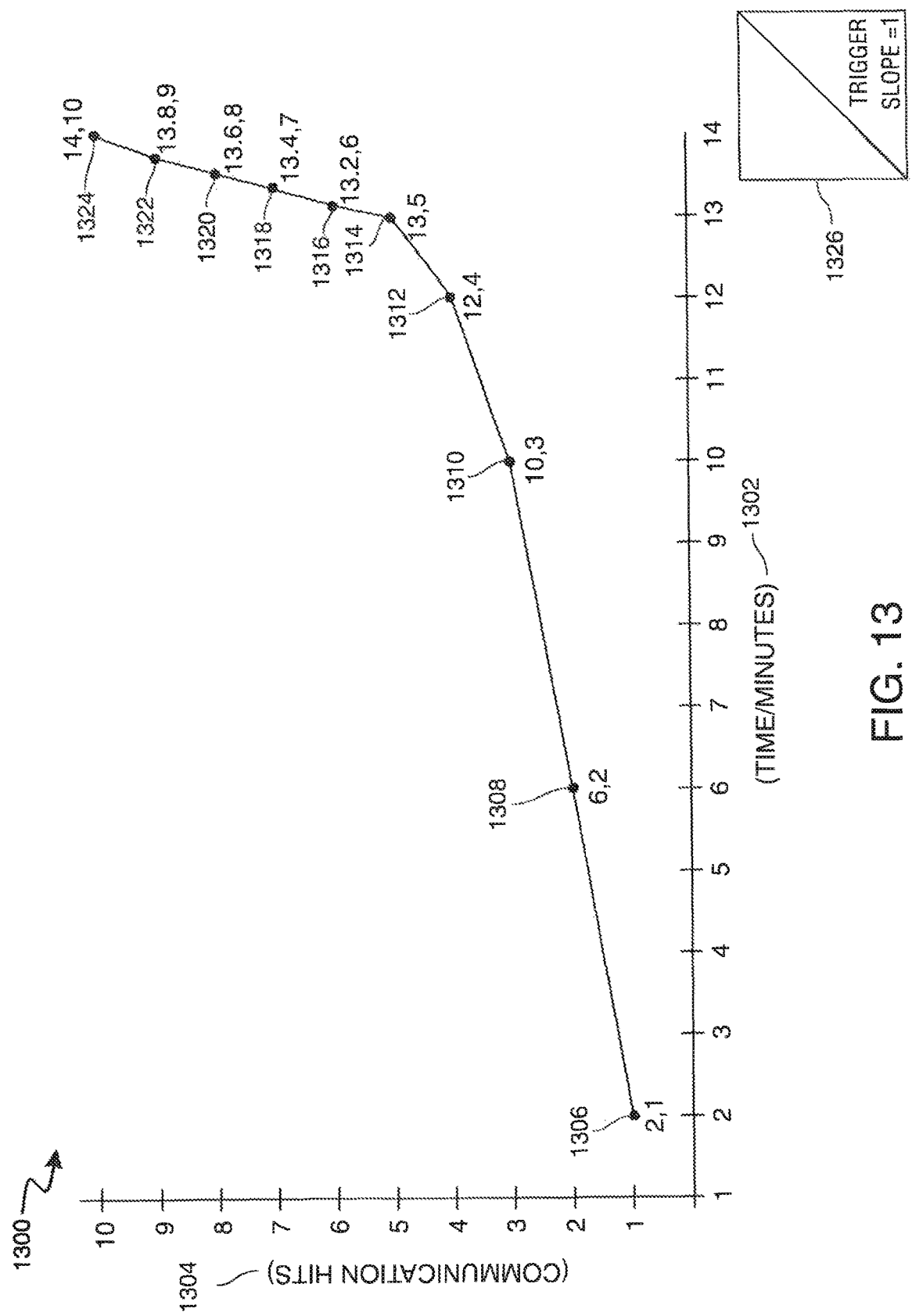
FIG. 13 shows an illustrative diagram in accordance with principles of the disclosure.

FIG. 13 shows an exemplary graph 1300. Graph 1300 may display a scattered chart of sets of values. Each set may include an x and y value. The x-axis 1302 may correspond to the time (in minutes.) The y-axis 1304 may correspond to each text identifying a selected third party data custodian (referred to in FIG. 13 as a 'hit') found in a communication.

The system, in accordance with principles of the disclosure, may start a time clock at zero minutes and zero seconds. Point 1306, may be the first hit. The first hit may be identified at two minutes. Point 1308, may be the second hit. The second hit may be identified at six minutes. Point 1310, may be the third hit. The third hit may be identified at ten minutes. Point 1312, may be the fourth hit. The fourth hit may be identified at twelve minutes. Point 1314, may be the fifth hit. The fifth hit may be identified at thirteen minutes. Points 1316, 1318, 1320, 1322 and 1324 may be identified all within the thirteenth minute.

The system, when monitoring the dark web for these hits, may monitor the change in the rate of hits over time in order to identify the point prior to a significant increase in hits. The point, in this exemplary diagram, may be the trigger slope 1326. This may enable the system to protect the private data prior to the data being breached. The trigger slope may forecast an oncoming signal of an increase in hits.

Between each identified hit, the system may calculate a slope between the two hits. When the slope between two hits reaches a pre-determined trigger slope, the system may perform one or more measures for prevention of security breach of the private data.

The trigger slope, in this exemplary diagram, is equal to one. The slope measured between points 1306 and 1308 and between points 1308 and 1310 are equal to 0.25. The slope measured between points 1310 and 1312 is equal to 0.5. The slope measured between points 1312 and 1314 is equal to one. At this point the system may determine that the change in rate per unit of time between point 1312 and point 1314 is equal to the trigger slope.

In one embodiment, when the slope reaches the trigger slope, the system may retrieve and withdraw all private data within the selected third party data custodian, from external access.

In another embodiment, when the slope reaches the trigger slope, the system may increase the monitoring further.

Figure 14:
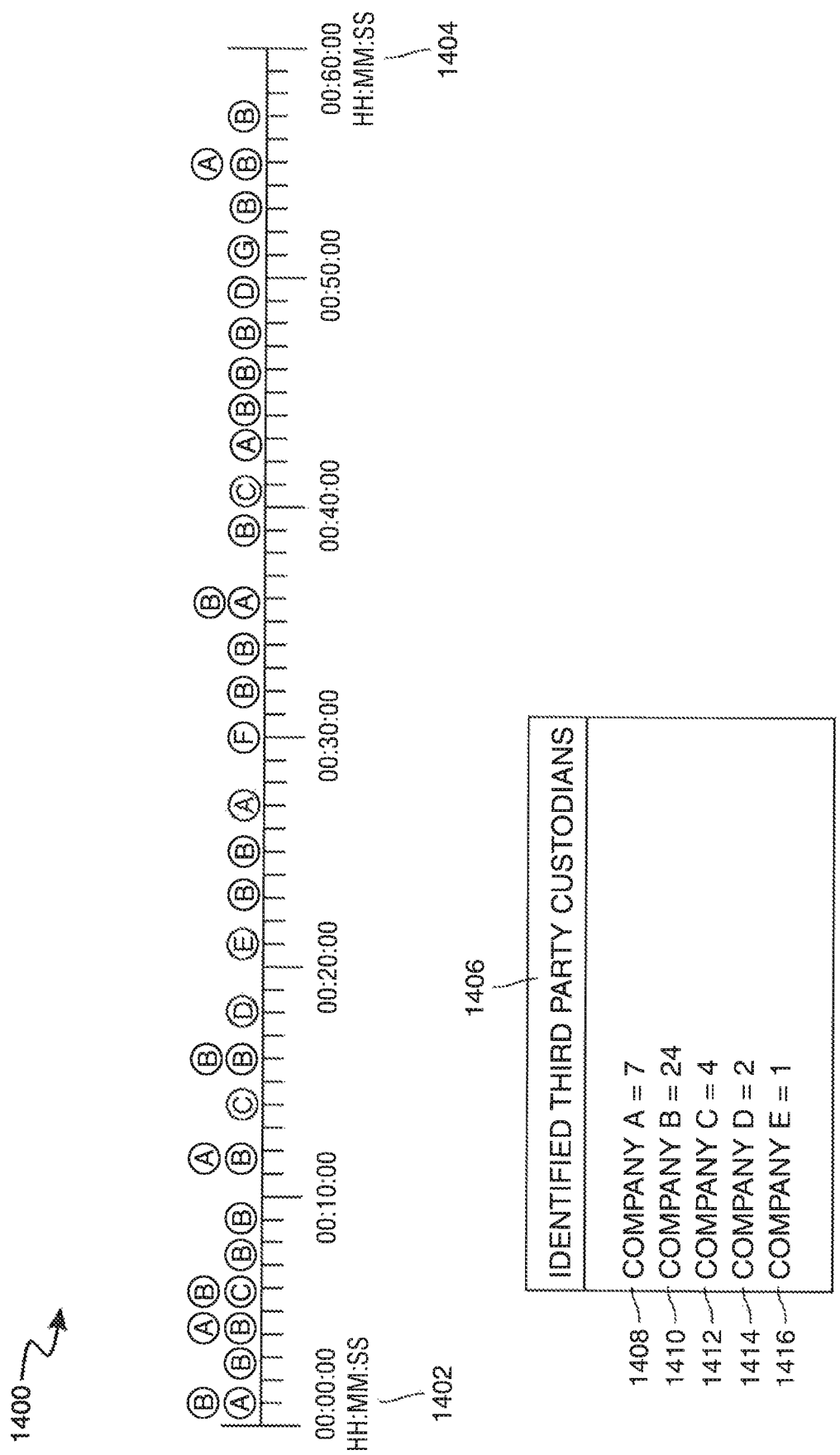
FIG. 14 shows an illustrative diagram in accordance with principles of the disclosure.

FIG. 14 shows an exemplary timeline 1400 of selected third party data custodian communications identified within the dark web in accordance with principles of the disclosure.

The selected third party data custodians in this exemplary timeline may include Company A 1408, Company B 1410, Company C 1412, Company D 1414 and Company E 1416.

The system may be monitoring for communications including text identifying any one or more of the selected third party data custodians 1408-1416. The system may be configured to run a time clock while monitoring. A pre-determined time period may be set while monitoring the dark web. The pre-determined time period may be, in this example, sixty minutes. When one or more communications are identified within the pre-determined time period, the system may perform one or more necessary actions to protect and monitor the associated private data. When numerous communications are identified within the pre-determined time period, the system may be configured to increase protective measures. This will enable the system to more quickly and securely protect the private data.

At 1406, the amounts of identified text associated with each third party data custodian may be listed. Company A 1408 may be identified seven times within the sixty minute time period. Company B 1410 may be identified twenty four times within the sixty minute time period. Company C 1412 may be identified four times within the sixty minute time period. Company D 1414 may be identified two times within the sixty minute time period. Company E 1416 may be identified one time within the sixty minute time period.

In this example, in response to the detection, the system may execute increased measures of protection for Company B 1410 than for the remaining companies. The system may automatically withdraw and/or lock the private entity data within Company B after identifying the company twenty four times within the sixty minute time period.

Thus, methods and apparatus for identifying a level of private data exposure associated with a selected third party data custodian is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for reducing a level of secure data exposure associated with a third party data custodian, the third party

21 data custodian selected from a plurality of third party data custodians associated with a pre-determined entity, the method being performed on dark web users communications within a dark web portion of the internet, the method enabling protection of private data of the pre-determined entity, the method comprising:

searching, periodically, the dark web users communications using a text-search analysis engine located on a centralized server, the searching for retrieving communications comprising a hit, the hit being text identifying the selected third party data custodian;

simultaneous to the searching, running a time clock to assign a time-stamp of a time of identification of each communication comprising the hit;

upon identifying a communication comprising the hit:
assigning the time-stamp to the communication; and
calculating a slope between the time-stamp of the communication and a time-stamp of a communication identified immediately prior to the communication;

when the slope reaches a pre-determined trigger slope, withdrawing the pre-determined entity's data from the selected third party data custodian;

increasing a monitoring of the dark web by searching for communications comprising text identifying the third party data custodian and text identifying the pre-determined entity; and when at least two or more communications are identified comprising both text identifying the third party data custodian and text identifying the pre-determined entity, locking the private data from external access.

2. The method of claim 1 wherein when the rate per unit of time of identifying text is equal to or greater than the pre-determined rate per unit of time, the method further comprises locking the private data residing within a network of the selected third party data custodian from external access.

3. The method of claim 1 wherein the time clock, at a start of the searching, is set to a start time of zero hours, zero minutes and zero seconds and the time stamp assigned to each identifying text is calculated based off of the start time.

4. The method of claim 1 wherein following the identifying, the method further comprises:
retrieving the one or more communications comprising the identifying text; and
analyzing the one or more communications, using sentiment analysis, to identify one or more keywords linking to the level of the secure data exposure.

5. The method of claim 4 wherein when one or more keywords are identified, the method further comprises increasing a monitoring of the private data, the increasing comprising searching, continuously, the dark web users communications for additional communications comprising identifying text.

6. The method of claim 1 wherein when a cluster of communications within a single location are identified to include identifying text and every communication within the cluster of communications is identified to have occurred within a pre-determined period of time, the method further comprises increasing a monitoring at the single location, the increasing comprising:
searching, continuously, the single location; and
analyzing further, the cluster of communications identified within the single location, for negative sentiment data.

7. The method of claim 1 wherein when a plurality of identifying texts are identified amongst a plurality of com-

22 munications within a pre-determined period of time the method further comprises, increasing a monitoring of the selected third party data custodian by searching the dark web continuously for additional identifying text.

8. The method of claim 7 wherein the pre-determined period of time is between zero and sixty minutes.

9. The method of claim 1 further comprising selecting a first subset of third party data custodians from the plurality of third party data custodians, the selecting for identifying the level of secure data exposure, the selecting comprising extracting from the plurality of third party data custodians, third party data custodians that have access to private data associated with the pre-determined entity or maintain within a database, private data associated with the pre-determined entity.

10. The method of claim 8 further comprising:
selecting a second subset of third party data custodians, the second subset being a subset selected from the first subset of third party data custodians, the selecting comprising extracting from the first subset, third party data custodians that have access to entity-related private data and/or maintain the entity-related private data;
and searching, periodically, dark web users communications for communications comprising identifying text associated with the third subset of second party data custodians.

11. The method of claim 8 further comprising:
selecting a third subset of third party data custodians, the third subset being a subset selected from the first subset of third party data custodians, the selecting comprising extracting from the first subset of third party data custodians, third party data custodians that have access to customer-related private data and/or maintain the customer-related private data; and
searching, continuously, the dark web users communications for communications comprising identifying text associated with the third subset of third party data custodians.

12. A dark web monitoring system for monitoring dark web users' communications within a dark web portion of the internet, the monitoring for identifying a level of secure data exposure associated with a selected third party data custodian, the third party data custodian selected from a plurality of third party data custodians associated with a pre-determined entity, the system comprising:
a central server associated with the pre-determined entity, the central server comprising:
a text-analysis search engine configured to:
search, periodically, the dark web, the searching for to identify communications comprising a hit, the hit being text identifying the selected third-party data custodian; and
in response to the search, identify one or more communications comprising the hit;
a time clock configured to, simultaneous to the search, assign a time-stamp of a time of identification of each communication comprising the hit;
at least one processor coupled to a memory and configured to:
for each communication comprising the hit:
assign the time-stamp to the communication; and
calculate a slope between the time-stamp of the communication and a time-stamp of a communication identified immediately prior to the communication;

when the slope reaches a pre-determined trigger slope, withdraw the pre-determined entity's data from the selected third party data custodian;

increase a monitoring of the dark web by searching for communications comprising text identifying the third party data custodian and text identifying the pre-determined entity; and when at least two or more communications are identified comprising both text identifying the third party data custodian and text identifying the pre-determined entity, lock the private data from external access.

13. The dark web monitoring system of claim 12 wherein when the rate per unit of time of identifying text is equal to or greater than double the pre-determined rate per unit of time, the system is configured to lock down private data associated with the selected third party data custodian from external access.

14. The dark web monitoring system of claim 12 wherein the system is further configured to:

store, in a database within the central server, the one or more communications comprising the identifying text, to enable a deep-analysis of a sentiment of the one or more communications;

analyze, using sentiment analysis, the one or more communications comprising identifying text, to identify negative sentiment data;

for each communication comprising negative sentiment data, increase a total negative sentiment communication occurrence counter by one digit; and wherein, when a percentage of the total name count occurrence counter divided by the total negative sentiment communication occurrence counter is equal to or greater than a pre-determined percentage, the system is configured to increase a monitoring of the private data by searching, continuously, the dark web users communications for additional communications comprising identifying text and negative sentiment data.

15. The dark web monitoring system of claim 14 wherein when the percentage is equal to or greater than the pre-determined percentage, the system is configured to lock the private data within a network of the third party from external access.

16. The dark web monitoring system of claim 12 wherein the processor is further configured to, for each communication comprising the identifying text, retrieve a communication location associated with each communication; and when a cluster of communications within a single location are identified to include identifying text and a time of identifying of each of the cluster of communications are within a shortened period of time, the system is further configured to increase a monitoring at the single location, the increasing comprising:

searching, the single location continuously; and analyzing further, the cluster of communications identified within the single location, for negative sentiment data.

17. The dark web monitoring system of claim 12 wherein the central server comprises a third-party data custodian library stored on a database within the central server, the library storing a list of a plurality of third-party custodians linked to the pre-determined entity, the third party data custodian library comprising a plurality of tiers of third party custodians, the plurality of tiers comprising:

a first subset of third party data custodians that have access to private data associated with the pre-determined entity or maintain within a database, private data associated with the pre-determined entity;

a second subset of third party data custodians, the second subset being a subset of the first subset of third party data custodians, the second subset comprising third party data custodians that have access to entity-related private data and/or maintain entity-related private data; and a third subset of third party data custodians, the third subset being a subset of the first subset, the third subset comprising third party data custodians that have access to customer-related private data and/or maintain customer-related private data.

18. The dark web monitoring system of claim 17 wherein the system is configured to select a plurality of third party data custodians from the third party data custodian library and search the dark web for identifying text associated with each of the plurality of third party data custodians.

19. The dark web monitoring system of claim 12 wherein the dark web is a part of a deep web not indexed by search engines and comprises, publicly visible websites that hide internet protocol ("IP") addresses of servers that run the websites.

20. A method for reducing a level of private data exposure associated with a plurality of third party data custodians, the plurality of third party data custodians selected from a third party data custodian library associated with a pre-determined entity, the method being performed on dark web users communications within a dark web portion of the internet, the method enabling protection of private data of the pre-determined entity, the method comprising:

searching, periodically, the dark web users communications using a text-search analysis engine located on a centralized server, the searching for retrieving communications comprising a hit, the hit being text identifying and corresponding to any one or more of the plurality of third party data custodians;

simultaneous to the searching, running a time clock;

upon identifying a communication comprising the hit:
assigning a time-stamp to the hit; and
calculating a slope between a time-stamp of the hit and a time-stamp of a hit identified immediately prior to the hit;

when the slope reaches a pre-determined trigger slope, withdrawing the pre-determined entity's data from the selected third party data custodian; and increasing a monitoring of the dark web for communications comprising the hit and text identifying the pre-determined entity.

* * * * *